United States Patent [19]
Ichikawa et al.

[11] Patent Number: 5,647,321
[45] Date of Patent: Jul. 15, 1997

[54] ACTUATING APPARATUS APPLICABLE TO ACTUATION OF VALVE USED FOR CONTROLLING ENGINE IDLING REVOLUTION

[75] Inventors: Toshiro Ichikawa, Hiratsuka; Yoshiyuki Kobayashi; Hideaki Nakamura, both of Atsugi, all of Japan

[73] Assignee: Unisia Jecs Corporation, Atsugi, Japan

[21] Appl. No.: 606,281

[22] Filed: Feb. 23, 1996

[30] Foreign Application Priority Data

Feb. 24, 1995 [JP] Japan ................................. 7-37076
Feb. 24, 1995 [JP] Japan ................................. 7-37087
Feb. 27, 1995 [JP] Japan ................................. 7-38078

[51] Int. Cl.$^6$ ............................. F02D 7/00; H02K 21/26
[52] U.S. Cl. ................................. 123/399; 310/154
[58] Field of Search .................... 123/399, 339.14, 123/339.25, 339.26, 585, 352; 310/154

[56] References Cited

U.S. PATENT DOCUMENTS

| | | | |
|---|---|---|---|
| 4,913,114 | 4/1990 | Kalippke et al. | 123/339.25 |
| 4,976,237 | 12/1990 | Bollinger | 123/339.25 |
| 5,003,947 | 4/1991 | Lemberger | 123/339.25 |
| 5,065,718 | 11/1991 | Suzuki et al. | 123/339.25 |
| 5,239,961 | 8/1993 | Neidhard et al. | 123/339.25 |
| 5,365,903 | 11/1994 | Watanabe | 123/339 |
| 5,375,574 | 12/1994 | Tomisawa et al. | 123/339 |
| 5,520,150 | 5/1996 | Kimoto | 123/339.26 |

FOREIGN PATENT DOCUMENTS

| | | | |
|---|---|---|---|
| 3500530 | 12/1989 | Germany | 123/399 |
| 64-2023 | 1/1989 | Japan | 123/399 |

*Primary Examiner*—Raymond A. Nelli
*Attorney, Agent, or Firm*—Foley & Lardner

[57] ABSTRACT

In an actuating apparatus applicable to an actuation of a valve installed in an intake air passage of an internal combustion engine, a first magnetic circuit ($D_1$) is formed with a stationary member (A) and with a part of a driven member (B), the driven member being disposed within the stationary member so as to be linearly or angularly displaced, and a second magnetic circuit ($D_2$) is formed in the stationary member and another part of the driven member so as to be branched from the first magnetic circuit, a strength of a magnetic flux flowing through the second magnetic circuit being the same as that of a magnetic flux flowing through the first magnetic circuit and a direction of the magnetic flux flowing through the second magnetic circuit being opposite to that of the magnetic flux flowing through the first magnetic circuit. Under the condition described above, at least one new magnetic flux is generated by means of electromagnetic coil(s), a direction of the new magnetic flux being such that the magnetic flux flowing through either of the first or second magnetic circuit is strengthened and that flowing through the other of the first or second magnetic circuit is weakened so that the driven member is linearly or angularly displaced at a position at which strengths of both magnetic fluxes flowing through the first and second magnetic circuits become again balanced.

26 Claims, 16 Drawing Sheets

ROTOR ROTATIONAL ANGLE θ

ACTUATING APPARATUS APPLICABLE TO ACTUATION OF VALVE USED FOR CONTROLLING ENGINE IDLING REVOLUTION

BACKGROUND OF THE INVENTION

1. Field of the Invention

The present invention relates to an actuating apparatus (actuator) applicable to, for example, an actuation of an electromagnetic valve used for controlling an idling revolution of an internal combustion engine, the valve being installed in an intake air passage and being exposed to an intake air flow.

2. Description of the Related Art

A previously proposed actuator is exemplified by a Japanese Patent Application Second Publication No. Showa 64-2023 published on Jan. 13, 1989.

In the above-identified Japanese Patent Application Second Publication, a rotatable two-pole magnetized permanent magnet is used as a rotor and is rotated within a space (which is long in an axial direction of a first magnetic circuit (path)) is formed within the first magnetic circuit so that a magnetic resistance of a magnetic path generated by the rotating permanent magnet is varied, thus a torque to return the permanent magnet to a normal stable position (in a direction connecting both narrowly formed parts of the space, namely, in a direction of a magnetic flux generated by the permanent magnet orthogonal to an axial direction of the first magnetic path) being acted upon the rotating permanent magnet.

In this state, when a power is supplied to a coil installed in the previously proposed actuating apparatus so as to generate a magnetic flux in the axial direction of the first magnetic circuit which is orthogonal to the magnetic flux generated by the permanent magnet, thus the rotor, i.e., the permanent magnet being rotated from the neutral stable position up to an arbitrary angular position determined according to a magnitude (strength) of the magnetic flux (a magnitude of a power supply current to the coil). Consequently, the rotor can be held at the arbitrary stable angular position.

In addition, in the previously proposed actuating apparatus, another yoke member (a second yoke) made of a ferromagnetic material and which is installed so as to form a second magnetic circuit (path) serves to reduce the magnetic resistance of the magnetic circuit formed by the rotatable permanent magnet at the neutral stable position so as to enlarge the torque to return the permanent magnet to the neutral stable position.

Consequently, a torque variation rate (gradient) with respect to the rotating angle of the rotatable permanent magnet is enlarged. That is to say, a force acted upon the permanent magnet to hold it at its position is enlarged.

However, the previously proposed actuating apparatus disclosed in the above-identified Japanese Patent Application Second Publication has the following problems to be solved.

That is to say, in the previously proposed actuating apparatus, the rotatable two-pole magnetized permanent magnet is arranged as the rotor in the space formed within the yoke member (first yoke) made of the so ferromagnetic material for forming the first magnetic circuit (path).

In details, a whole periphery of a magnetic field formed around the rotatable permanent magnet is short-circuited by means of the member (first yoke) used to form the first magnetic circuit (path).

Part of the magnetic flux generated by the permanent magnet in the direction of the second magnetic path orthogonal to that of the magnetic flux in the first magnetic path is also branched into the first magnetic circuit in which the coil is provided so that the magnetic flux generated in the direction of the first magnetic path orthogonal to the magnetic flux generated by the rotating permanent magnet is reduced (weakened). Therefore, a variation in the magnetic resistance of the magnetic field along with the rotation of the permanent magnet becomes moderate.

Consequently, the torque variation (gradient) with respect to the rotating angle of the permanent magnet is small. In addition, the force acted upon the permanent magnet so as to hold it at its position against an external disturbance torque becomes weak.

Hence, the rotated position of the permanent magnet, namely, the rotor is largely varied according to a magnitude of the external disturbance torque.

For example, in a case where the previously proposed actuating apparatus directly actuates a valve installed in a part of an intake air passage of an internal combustion engine, a torque generated by an external force such as a force generated by an intake air stream (air flow force) is acted upon the rotatable permanent magnet as the rotor in the form of the external disturbance so that the rotated position of the permanent magnet is varied and, accordingly, an opening angle of the valve is varied. Consequently, a hunting occurs in an engine revolution speed.

It is noted that even if the second magnetic circuit is formed by means of the yoke member (second yoke) made of the ferromagnetic material, the whole periphery of the magnetic field generated by the member (first yoke) for forming the first magnetic circuit (path) is short-circuited so that a large improvement of prevention of the variation of the rotated position of the permanent magnet cannot be achieved.

In addition, a split may be provided in the member (first yoke) for forming the first magnetic circuit (path) so as to be divided into two in place of the narrowly formed space described above, thus eliminating the magnetic short-circuit around the permanent magnet.

However, since a first yoke of the first yokes divided into two by means of the split is linked into the first magnetic circuit, the first magnetic circuit itself is linked into the first magnetic circuit, the first magnetic circuit itself forms a magnetically short-circuit route for the permanent magnet. Consequently, the large improvement of prevention of the variation in the rotated position cannot be achieved as well as described above.

Although it is possible to eliminate the above-described problem by enlarging the coil magnetomotive force required to rotate the permanent magnet through the increase in the power supply current to the coil or by using a rare earth element magnet having a strong magnetomotive force for the permanent magnet, the former results in a large power consumption and the latter results in an expensive (increase in cost) actuating apparatus since the rare earth element magnet is very expensive as compared with a ferrite magnet.

It is noted that the ferrite magnet in a cylindrical shape is difficult to be manufactured since cracks are often generated in the ferrite magnet in the cylindrical shape during the manufacturing process.

SUMMARY OF THE INVENTION

It is therefore an object of the present invention to provide an actuating apparatus which can enlarge a force acted upon a driven member (such as a rotor) so as to hold it at its position against an external disturbance without increase in a power consumption and in a manufacturing cost of the actuating apparatus.

The above-described object can be achieved by an actuating apparatus comprising:

a) a stationary member;
b) a driven member;
c) first magnetic circuit forming means for forming a first magnetic circuit with said stationary member and with a part of said driven member;
d) second magnetic circuit forming means for forming a second magnetic circuit with said stationary member and with another part of said driven member so as to be branched from a magnetic flux flowing in said first magnetic circuit on said driven member, a strength of a magnetic flux flowing in said second magnetic circuit being the same as that flowing in said first magnetic circuit and a direction of the magnetic flux flowing in said second magnetic circuit being opposite to that flowing in said first magnetic circuit so that said driven member is held at a position at which both of the strengths of the magnetic fluxes flowing through said first and second magnetic circuits are mutually balanced; and
e) new magnetic flux generating means for generating at least one new magnetic flux whose direction is such that the magnetic flux flowing in either of the first or second magnetic circuit is strengthened and the magnetic flux flowing in the other of said first or second magnetic circuit is weakened so that the driven member is displaced at another position at which the strengths of the magnetic fluxes in both of the first and second magnetic circuits become again balanced.

The above-described object can also be achieved by providing an actuating apparatus comprising:

a) a stationary member;
b) a driven member made of a non-magnetic material and arranged in said stationary member so as to be displaceable along said stationary member;
c) a pair of first and second fixed members made of magnetic materials spaced apart from each other with a first gap therebetween so as to be magnetically separated from each other with a first gap and extended along a displaceable direction of said driven member;
d) at least one stator made of the magnetic material and extended on said stationary member so that a first end surface thereof is faced against a second end surface of said first fixed member adjacent to said first gap with a second gap therebetween and a third end surface thereof is faced against a fourth end surface of said second fixed member adjacent to said first gap with a third gap;
e) at least one permanent magnet extended on the stationary member in a direction approximately orthogonal to said stator so as to face against a fifth end surface of said first fixed member so that a magnetic pole faced against said fifth end surface of said first fixed member is different from that magnetized on said fifth surface and so as to face against a sixth end surface of said second fixed member so that the magnetic pole faced against the sixth end surface of said second fixed member is different from that magnetized on said sixth end surface, said first end surface of said stator, said second end surface of said first fixed member, said fifth end surface of said first fixed member, said permanent magnet, and said stationary member forming a first magnetic circuit and said second end surface of said stator, said third end surface of said first fixed member, said permanent magnet, said stationary member forming a second magnetic circuit, directions of magnetic fluxes flowing in said first and second magnetic circuits being different from each other within said stator and magnetomotive forces of said first and second magnetic circuits being mutually the same so as to make said driven member not be displaced.

The above-described object can also be achieved by providing a method for actuating a driven member (B) to displace at a position, said driven member being disposed within a stationary member (A) and being linked to a valve installed in an intake air passage of an internal combustion engine and exposed to an intake air flow as external disturbance, said method comprising the steps of:

a) forming a first magnetic circuit ($D_1$) with said stationary member and with a part of said driven member;
b) forming a second magnetic circuit ($D_2$) with said stationary member and with another part of said driven member so as to be branched from a magnetic flowing in said first magnetic circuit on said driven member, a strength of a magnetic flux flowing through said second magnetic circuit being the same as that of a magnetic flux flowing through said first magnetic circuit and a direction of the magnetic flux flowing through said second magnetic circuit being opposite to that of the magnetic flux flowing through said first magnetic circuit so that said driven member is held at another position at which both of the strengths of the magnetic fluxes flowing through said first and second magnetic circuits are mutually balanced; and
c) generating at least one new magnetic flux whose direction is such that the magnetic flux flowing through either of said first or second magnetic circuit is strengthened and the magnetic flux flowing through the other of the first or second magnetic circuit is weakened so that the driven member is displaced at the position at which the strengths of the magnetic fluxes in both of the first and second magnetic circuits become again balanced.

BEST MODE FOR CARRYING OUT THE INVENTION

Reference will hereinafter be made to the drawings in order to facilitate a better understanding of the present invention.

First Embodiment

Figure 1:
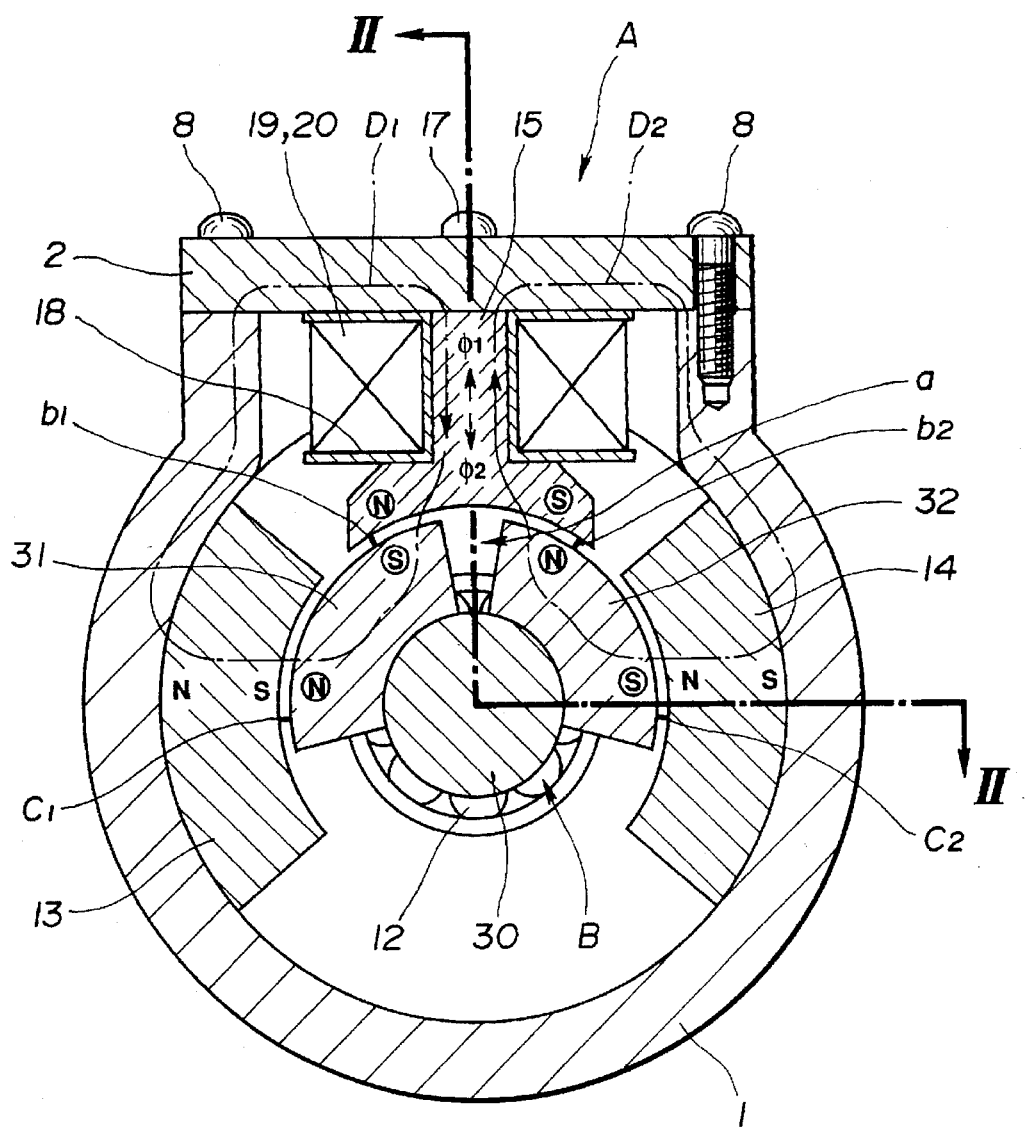
FIG. 1 is a cross-sectional view of an actuating apparatus in a first preferred embodiment according to the present invention cut away along a line I—I of FIG. 2.

FIG. 1 shows a cross sectional view of an actuating apparatus in a first preferred embodiment according to the present invention cut away along a line of I—I of FIG. 1.

Figure 2:
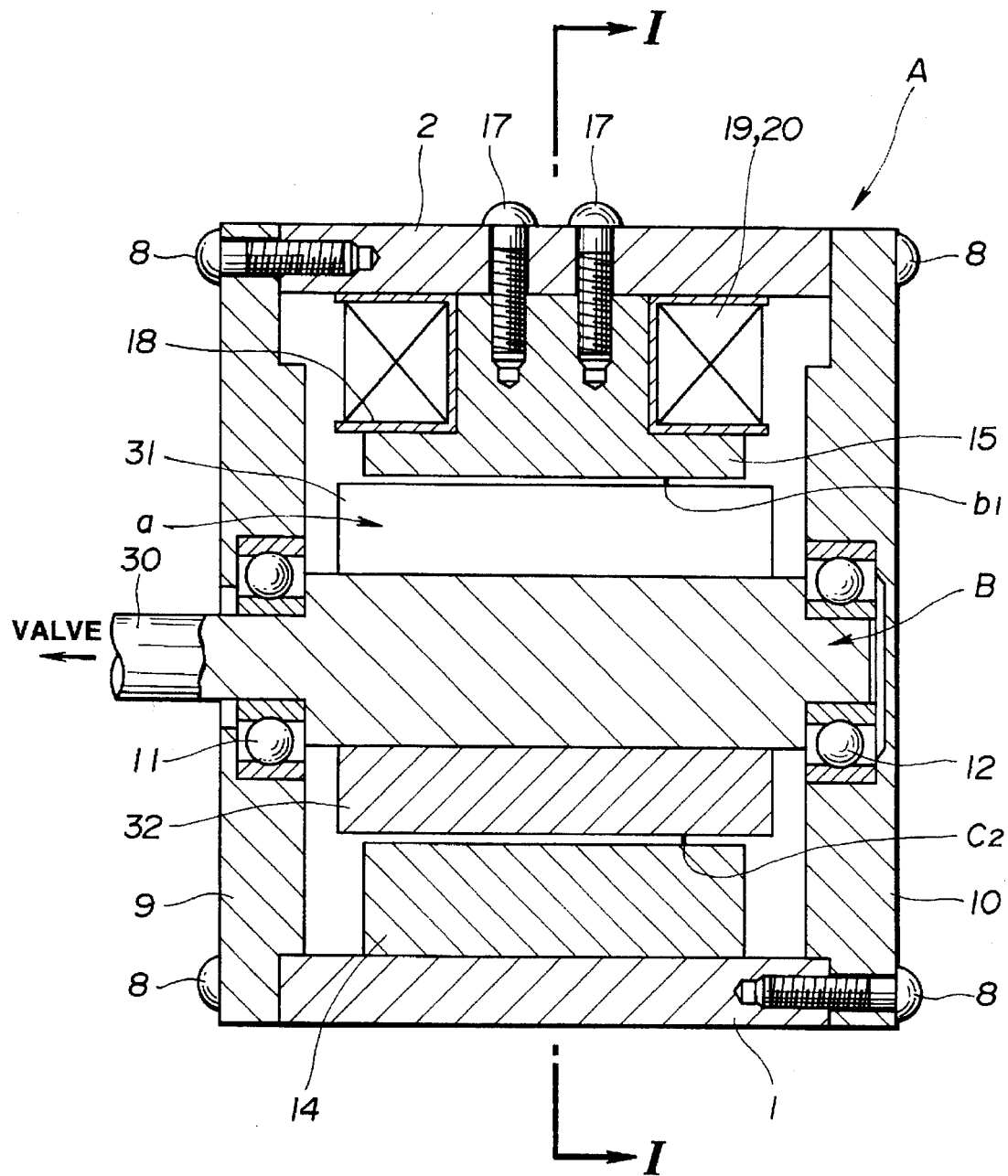
FIG. 2 is a cross-sectional view of the actuating apparatus in the first preferred embodiment according to the present invention cut away along the line II—II of FIG. 1.

FIG. 2 shows a cross sectional view of the actuating apparatus in the first embodiment according to the present invention cut away along a line of II—II of FIG. 1.

In FIGS. 1 and 2, a stationary member generally denoted by A surrounds a driven member generally denoted by B. The stationary member A is fixed to or installed on, for example, a body portion of a vehicle.

The stationary member A includes: a body yoke 1 formed of a ferromagnetic material in a generally cylindrical shape of the cross section and having bent portions as shown in FIG. 1 from which wall portions thereof are extended vertically; a flat, plate-like, shaped stator yoke 2 made of the ferromagnetic material and linked to upper ends of the wall portions of the body yoke 1, both of the body yoke 1 and stator yoke 2 forming a yoke portion of the stationary member A in the generally cylindrical shape.

Caps (also called encapsulations) 9 and 10, each made of a non-magnetic material such as aluminum, are installed on opening ends of both lateral sides of the yoke portion formed in the cylindrical shape as shown in FIG. 2. In FIG. 1, a plurality of screws 8 serve to link the respective yoke and cap members 1, 2, 9 and 10.

A pair of permanent magnets 13 and 14, each being magnetized so as to have two poles on an outer surface and on an inner surface thereof with respect to the body yoke 1, are adhered and extended onto an inner periphery of a cylindrical portion of the body yoke 1 in its radial direction, as appreciated from FIG. 1.

Ferrite magnets are used as the pair of the permanent magnets 13 and 14.

Each of the inner surface of the pair of the permanent magnets 13 and 14 is formed in an arc shape with an axial center of the cylindrical portion of the body yoke 1 as a center and is faced symmetrically against the other inner surface of the permanent magnet 13 or 14.

In addition, the inner surfaces of the pair of the permanent magnets 13 and 14 have mutually different poles in the radial direction of the cylindrical portion of the body yoke 1 as appreciated from FIG. 1. That is to say, the inner surface of one of the pair of the permanent magnets 13 and 14 which is located at a left side as viewed from FIG. 1 has an S (South) pole and the outer surface of the corresponding permanent magnet 13 has an N (North) pole. The inner surface of the other of the pair of the permanent magnets 13 and 14 which is located at a right side as viewed from FIG. 1 has the N pole and the outer surface of the corresponding permanent magnet 14 has the S pole as viewed from FIG. 1.

A stator denoted by 15 is fixed onto an inner periphery of the stator yoke 2 by means of screws 17, as appreciated from FIGS. 1 and 2.

The stator 17 is also made of the ferromagnetic material. The stator 17 has its inner peripheral surface formed in the arc shape of the cross section with the axial center of the cylindrical portion of the body yoke 1 as the center in the same way as the pair of the permanent magnets 13 and 14. In addition, a pair of coils 19 and 20 are wound around an insulating bobbin 18 located around an upper wall portion of the stator 15 to generate either or both of magnetic fluxes $\phi_1$ or $\phi_2$ in the radial direction of the stator 15. For drives of either or both of the coils 19 and 20, the detailed explanation thereof will be made later.

On the other hand, the structure of the driven member B will be described below.

The driven member B includes: a rotor shaft 30; and a pair of rotor yokes 31 and 32 adhered around an outer periphery of the rotor shaft 31, as shown in FIGS. 1 and 2.

The rotor shaft 30 is formed of a stainless steel (SUS304) which is the non-magnetic material, with both ends thereof being rotatably and axially supported on the caps 9 and 10 by means of a pair of bearings 11 and 12 as appreciated from FIG. 2.

The rotor yokes 31 and 32 are made of the ferromagnetic materials and formed in the respective arc shapes of cross section.

As shown in FIG. 1, a first gap (denoted by a) which is wide enough to be separable magnetically from each of the pair of rotor yokes 31 and 32 is formed between upper end surfaces (second end surface and fourth end surface) of the pair of the rotor yokes 31 and 32 in its peripheral directions of the respective rotor yokes 31 and 32. A large gap is, in turn, formed on respective lower end surfaces of the pair of the rotor yokes 31 and 32 in circumferential directions of the respective rotor yokes 31 and 32.

In more details, an outer peripheral surface (including a second end surface and a fourth end surface) of both of the rotor yokes 31 and 32 located at the first gap a is faced against the inner peripheral surface of the stator 15 in the arc shape via small gaps $b_1$ and $b_2$ (second and third gaps), as shown in FIG. 1. In addition, parts of the outer peripheral surfaces located at other ends of the pair of rotor yokes 31 and 32 are faced against parts of the inner peripheral ends in the arc shapes of the pair of the permanent magnets 13 and 14 via small gaps (fourth gap and fifth gap) denoted by $c_1$ and $c_2$, as shown in FIG. 1.

Hence, as shown in FIG. 1, a first magnetic path (circuit) $D_1$ denoted by a dot-and-dash line is formed in such a way that the magnetic flux generated from the left-handed permanent magnet 13 flows into an inner part of the body yoke 1, thereafter, into the stator yoke 2 and stator 15, passes through the small gap $b_1$ (second gap) into the left-handed rotor yoke 31, passes through the small gap $c_1$ (fourth gap), and returns into the left-handed permanent magnet 13.

On the other hand, a second magnetic circuit (path) $D_2$ denoted by the dot-and-dash line is formed in such a way that the magnetic flux generated from the right-handed permanent magnet 14 flows into the right-handed rotor yoke 32 passing through the small gap $c_2$ (fifth gap), passes through the small gap $b_2$ (third gap), thereafter, flows into the stator 1B, and returns to the right-handed permanent magnet 14 via the stator yoke 2 and the body yoke 1.

Hence, magnetic flux directions of both of the magnetic circuits (paths) $D_1$ and $D_2$ are mutually opposite to each other, as appreciated from FIG. 1.

Figure 3:
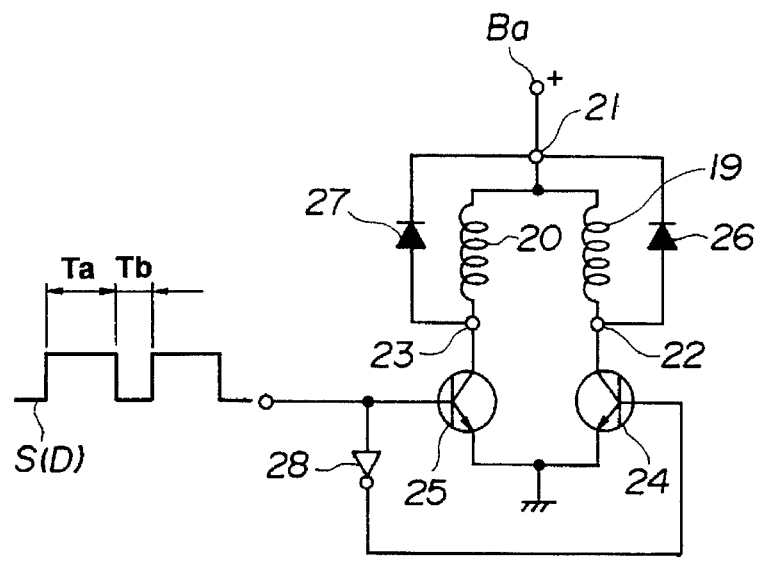
FIG. 3 is an electrical circuit diagram of a coil drive circuit connected to a pair of coils installed in the actuating apparatus shown in FIGS. 1 and 2.

Next, FIG. 3 shows an example of a coil drive circuit.

As shown in FIGS. 1 and 2, the pair of the coils 19 and 20 are wound around the stator 15 via the insulating bobbin 18.

Either one of the pair of the coils 19 or 20 has a winding start portion and the other coil 19 or 20 has a winding end portion, the winding start portion and the winding end portion being connected together with a plus pole+of a DC power supply such as a battery Ba via a terminal 21.

Either one of the pair of the coils 19 or 20 has the winding end portion and the other coil 19 or 20 has the winding start portion, both of the winding start and end portions being connected to collectors of NPN (bipolar) transistors 24 and 25 via terminals 22 and 23, respectively. Emitters of both NPN transistors 24 and 25 are grounded. A pair of surge absorbing (freewheel) diodes 26 and 27 are connected across the respective coils 19 and 20 between the terminal 21 and the terminals 22 and 23, respectively.

In addition, a duty ratio signal (pulse width modulated signal) S(D) is inputted into a base of the one NPN transistor 25 whose collector is connected to the one coil 20 and is further inputted into the base of the other NPN transistor 24 whose collector is connected to the other coil 20 via an inverter 28.

Although a duty ratio signal generator for generating and outputting the duty ratio signal to each base of the NPN transistors 24 and 25 is not shown in FIG. 3, the structure of the duty ratio signal generator is well known, for example, includes a pulse generator and a pulse width modulator. Then, the pulse duty ratio is determined by means of, a microcomputer constituting a control unit for controlling, for example, an engine idling revolution speed.

During an ON time duration Ta of the duty ratio signal S(D) (,i.e., during a high voltage time duration Ta of the duty ratio signal), only the NPN transistor 25 is conducted so that n power supply current from the battery Ba flows into the one coil 20. On the other hand, during an OFF time duration Tb of the duty ratio signal S(D) (,i.e., during a low (zero) voltage time duration Tb of the duty ratio signal), only the other NPN transistor 24 is conducted so that the power supply current from the battery Ba flows into the other coil 19.

As described above, since the power supply current flowing directions into the respective coils 19 and 20 are mutually opposite to each other, the mutually opposite magnetic fluxes $\phi_1$ and $\phi_2$ are generated in the stator 15, as shown in FIG. 1.

Next, an operation of the actuating apparatus in the first embodiment will be described below.

(A) A case when no power supply current flows into both coils 19 and 20.

Although it is difficult to accurately analyze streams (flows) of magnetic fluxes since magnetic leakages are much in magnetic circuits, a main flow of the magnetic fluxes in the actuating apparatus will be described below.

In a state of the actuating apparatus wherein no power supply current flows into each of the coils 19 and 20, the magnetic fluxes generated by both of the pair of permanent magnets 13 and 14 flow into the first and second magnetic circuits $D_1$ and $D_2$ whose directions of the magnetic fluxes are mutually opposite within the stator 15 as shown in FIG. 1.

At this time, suppose that the rotor shaft 30 is rotated in either of rotation directions from a state shown in FIG. 1 by an external force, for example, manually.

Since areas of both small gaps $b_1$ and $b_2$ (second and third gaps) formed on mutually faced surfaces between the respective rotor yokes 31 and 32 and the stator 15, namely, cross sectional areas of both of the first and second magnetic circuits $D_1$ and $D_2$ become different from each other, such a magnetic resistance difference that a magnetic resistance of one smaller cross sectional area becomes larger than that of the other larger cross sectional area occurs.

Torques to rotate both of the rotor yokes 31 and 32 in a direction such that the magnetic resistances at both small gaps $b_1$ and $b_2$ (second and third gaps) are respectively reduced (the areas facing the respective small gaps $b_1$ and $b_2$ are respectively increased) are acted in mutually opposite directions.

Hence, a, so-called, returning torque to return the rotor shaft 30 to a neutral stable position (a state shown in FIG. 1) at which the areas of both of the small gaps (second and third gaps) formed mutually faced surfaces between the respective rotor yokes 31 and 32 and the stator 15 become equal to each other is always acted upon the rotor shaft 30.

In addition, suppose that the rotor shaft 30 shown in FIGS. 1 and 2 is rotated in either direction of rotation. At this time, areas of both small gaps $c_1$ and $c_2$ (fourth gap and fifth gap) formed mutually faced surfaces between each rotor yoke 31 and 32 and the pair of the permanent magnets 13 and 14 are mutually varied, namely, one of cross sectional areas of the first and second magnetic circuits $D_1$ and $D_2$ is increased but the other cross sectional area is decreased. Consequently, the magnetic resistance difference is generated in the same way as described above.

At these positions of the small gaps $c_1$ and $c_2$, the returning torque to return the rotor shaft 30 to the neutral stable position (the state shown in FIG. 1) such that the areas of the small gaps $c_1$ and $c_2$ become equal to each other is always acted upon the rotor shaft 30.

Hence, in the state of no power supply current to the coils 19 and 20, the rotor shaft 30 can be held at the neutral stable position.

The neutral stable position is expressed as a rotor rotational angle $\theta=0°$.

If the rotor shaft 30 is rotated (pivotally or angularly displaced) in either direction from the zero rotational angle ($\theta=0°$), the returning torque to the neutral stable position in proportion to a variation rate of the magnetic resistance due to the rotation of the rotor shaft 30 is generated. A magnitude (strength) of the returning torque provides a magnitude of the force to hold the rotor shaft 30 at its rotated position (expressed as a predetermined rotor angle $\theta$) against a torque generated as an external disturbance (disturbance torque).

Figure 4:
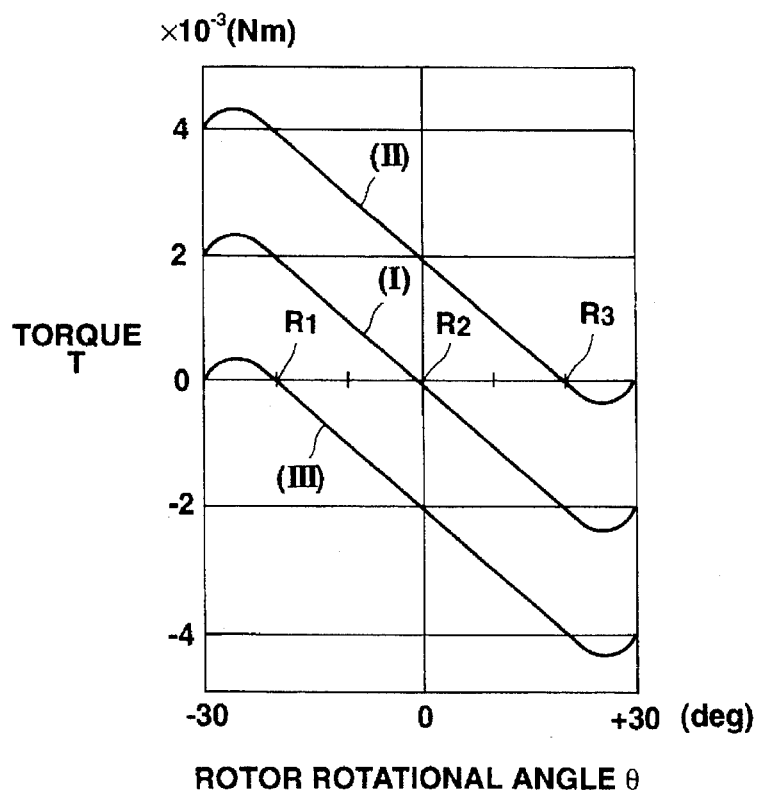
FIG. 4 is a characteristic graph of a return torque with respect to a rotating angle of a rotor for explaining an operation of the actuating apparatus shown in FIGS. 1 and 2.

FIG. 4 shows characteristic graphs of the returning torques T with respect to the rotational angle $\theta$ in three cases as will be described below.

Suppose that the rotation of the rotor shaft 30 in a counterclockwise direction is expressed as a minus angle and the rotation of the rotor shaft 30 in a clockwise direction is expressed as a plus angle.

The returning torque characteristic when the rotor shaft 30 is rotated in the state of no power supply current to the coils 19 and 20 is such as denoted by I of FIG. 4.

It is noted that the rotor rotational angle $\theta$ has the same direction as the returning torque T, namely, when the returning torque T is positive, the rotational angle $\theta$ is increased and when the returning torque T is negative, the rotational angle a is decreased.

A position of the rotor rotational angle $\theta=0°$ denoted by $R_2$ is the neutral stable position.

As the variation rate (gradient) of the returning torque T with respect to the rotational angle $\theta$ of the rotor shaft 30 becomes larger, i.e., as the variation rates of the magnetic resistances in the first and second magnetic circuits $D_1$ and $D_2$ become larger, the force to hold the rotor shaft at its rotated position $\theta$ against the disturbance becomes accordingly larger.

Hence, if the magnetic fluxes of the pair of permanent magnets 13 and 14 are concentrated into both of the first and second magnetic circuits $D_1$ and $D_2$, magnetic energies that the pair of the permanent magnets 13 and 14 have can effectively be utilized at maximum in the form of the returning torque T.

(B) A case when the power supply current flows into either of the coils 19 or 20.

Suppose that the duty ratio signal S(D) shown in FIG. 3 is inputted to the NPN transistors 24 and 25 so as to cause the power supply current to flow into either of the coils 19 or 20.

During the ON time duration Ta of the duty ratio signal S(D), the power supply current flows only into the one coil 20.

This causes, in the stator 15, the generations of the new magnetic flux in the direction of $\phi_2$ shown in FIG. 1 (which is the same as the magnetic flowing direction of the first magnetic circuit $D_1$ according to the magnetic flux generated by the left-handed permanent magnet 13 and which is opposite to the magnetic flux flowing direction of the second magnetic circuit $D_2$ according to the magnetic flux generated by the right-handed permanent magnet 14).

During the OFF time duration Tb of the duty ratio signal S(D), the power supply current flows only into the other coil 19.

This causes, in the stator 15, the generation of the other new magnetic flux in the direction of $\phi_1$, as shown in FIG. 1, (which is the same as the magnetic flux flowing direction of the second magnetic circuit $D_2$ according to the magnetic flux generated by the right-handed permanent magnet 14 and which is opposite to the magnetic flowing direction of the first magnetic circuit $D_1$ according to the magnetic flux generated by the left-handed permanent magnet 13).

However, since, in an actual practice, a coildrive frequency expressed as 1/(Ta+Tb) ranges about from 100 Hz to 500 Hz and each time constant of the respective coils 19 and 20 is sufficiently larger than the coil-drive period (Ta+Tb), an average current corresponding to either an off duty ratio (=Tb×100/(Ta+Tb) %) or an on duty ratio (=Ta×100/(Ta+Tb) %) flows into the coils 19 and 20 so that an average magnetic flux for the average current would be generated in the stator 15.

As described above, the power supply current to the one coil 19 causes the magnetic flux of the first magnetic circuit $D_1$ at the left-handed permanent magnet 13 to be weakened according to the magnetic flux in the direction of $\phi_1$ generated by the stator 15 and causes the magnetic flux of the magnetic circuit $D_2$ at the right-handed permanent magnet 14 to be strengthened. In addition, the power supply current to the other coil 20 causes the magnetic flux of the second magnetic circuit $D_2$ at the right-handed permanent magnet 14 to be weakened and causes the magnetic flux of the first magnetic circuit $D_1$ at the left-handed permanent magnet 13 to be strengthened.

Hence, if the ON duty ratio is 50% (OFF duty ratio is also 50%) and the strengths of both mutually opposite direction magnetic fluxes $\phi_1$ and $\phi_2$ are uniform in the stator 15, a balance of the strengths in both magnetic fluxes in the first and second magnetic circuits is maintained uniformly so that the rotor shaft is maintained at the neutral stable position, i.e., the zero rotational angle $\theta=0°$ denoted by $R_2$ of FIG. 4.

Next, when the ON duty ratio indicates 100% (OFF duty ratio indicates 0%), the magnetic flux $\phi_1$ caused by the one coil 19 indicates 0% and the magnetic flux $\phi_1$ caused by the other coil 20 indicates 100%.

Hence, while the magnetic flux of the first magnetic circuit $D_1$ passing through the stator 15 is strengthened by means of the new magnetic flux $\phi_2$ but that of the second magnetic circuit $D_2$ passing through the stator 15 is weakened by the same magnetic flux $\phi_2$, the strengths of the magnetic fluxes in both magnetic circuits $D_1$ and $D_2$ become unbalanced so that the magnetic resistances of both first and second magnetic circuits $D_1$ and $D_2$, the areas of the small gaps $b_1$ and $b_2$ and the small gaps $c_1$ and $c_2$ being the same, are unbalanced. Thus, a direction to balance the magnetic resistances, namely, the positive torque caused to rotate the rotor shaft 30 in the clockwise direction on is generated, this positive torque rotating the rotor shaft 30 up to the position of the rotor rotational angle $\theta=+20°$ denoted by $R_3$ of FIG. 4. Then, the returning torque T characteristic shown by [II] of FIG. 4 can hold the rotor shaft 30 at the rotated position, i.e., the rotational angle of $\theta$.

On the other hand, when the ON duty ratio indicates 0% (OFF duty ratio indicates 100%), the new magnetic flux $\phi_1$ caused by the one coil 19 indicates 100% but the new magnetic flux $\phi_2$ caused by the other coil 20 indicates 0%. At this time, the negative torque to rotate the rotor shaft 30 in the counterclockwise direction is generated. This negative torque causes the rotor shaft 30 to rotate up to the position denoted by $R_1$ of FIG. 4, i.e., the rotor rotational angle of $\theta = -20°$. Thus, the returning torque T characteristic shown by [III] of FIG. 4 can hold the rotor shaft at its rotated position of the rotational angle $\theta$. This means that the duty ratio control permits the rotational angle $\theta$ to be controlled at an arbitrary position in a range from $-20°$ to $+20°$.

Figure 5:
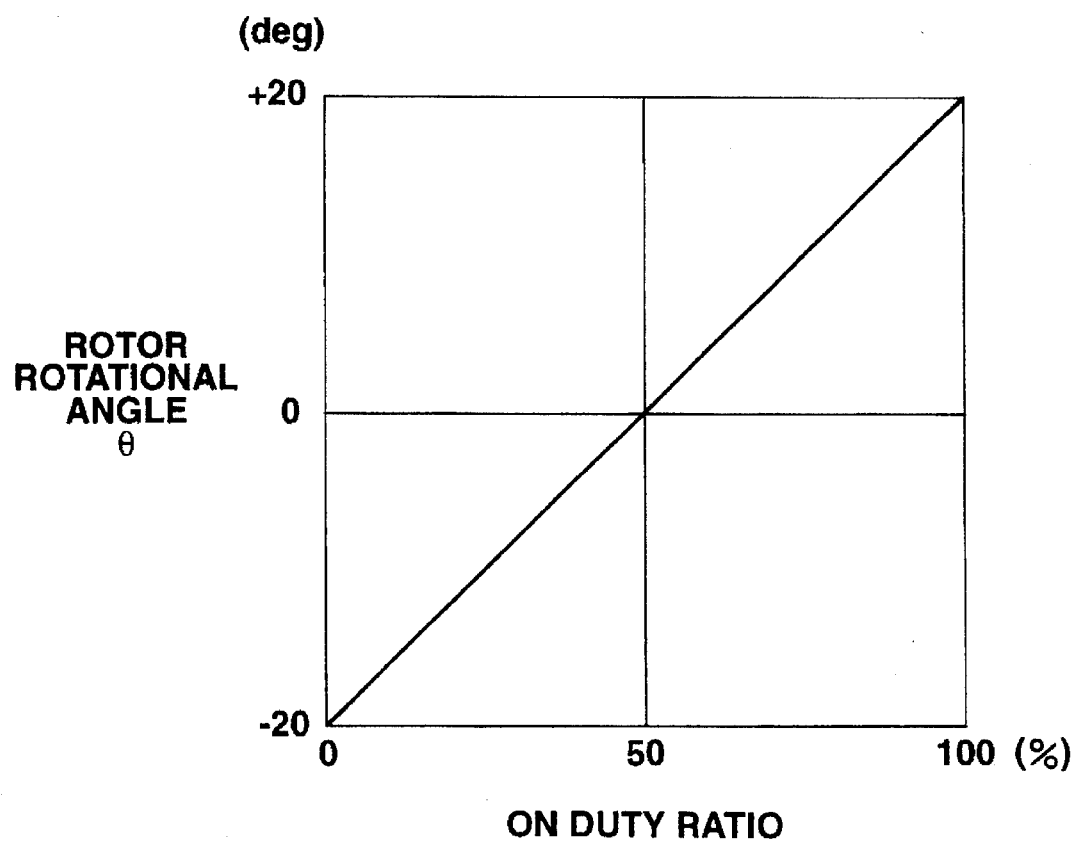
FIG. 5 is a characteristic graph of a rotor rotational angle with respect to an ON duty ratio for explaining the operation of the actuating apparatus shown in FIGS. 1 and 2.

FIG. 5 shows a variable characteristic of the rotor rotational angle $\theta$ with respect to the duty ratio.

As appreciated from FIG. 5, a linearly variable characteristic of the rotational angle $\theta$ can be achieved.

This is because the power supply to either of the coils 19 or 20 causes the directions of the new magnetic fluxes generated in the stator 15 to become mutually opposite so that one of the magnetic fluxes in the first and second magnetic circuits $D_1$ and $D_2$ is strengthened but the other is weakened, thus the rotor rotational angle $\theta$ being variably controlled, and a magnetic saturation due to an insufficient cross sectional area of the magnetic path in each of the first and second magnetic circuit $D_1$ and $D_2$ does not occur.

As described above, the actuating apparatus in the first embodiment has the following advantages.

(1) Since the magnetic fluxes generated from the pair of the permanent magnets 13 and 14 mainly flow into the first and second magnetic circuits $D_1$ and $D_2$ via the stator 15 and the pair of the rotor yokes 31 and 32 as appreciated from FIG. 1, other magnetic short-circuit paths are not present which provide a cause of wasteful consumptions of the magnetic energies as found in the previously proposed actuating apparatus described in the BACKGROUND OF THE INVENTION. Consequently, magnetic energies that the pair of the permanent magnets 13 and 14 have can effectively utilized. Hence, without the increase in the power consumption due to the increase in the power supply current flow into the coil member and without the cost increase due to the use of the expensive permanent magnets for the permanent magnet as described in the BACKGROUND OF THE INVENTION, the force for the rotor (driven member B) to hold it at its rotated position described as the rotor rotational angle $\theta$ against the external disturbance can be strengthened.

(2) Since the pair of the coils 19 and 20 are wound around the stator 15 to operatively generate new magnetic fluxes ($\phi_1$ and $\phi_2$), a considerably wide rotor rotational angular range $\theta_0$ can be achieved for the rotor shaft (driven member B).

(3) Since the control of the power supply current flow to either or both of the coils 19 and 20 is carried out using the duty ratio signal S(D), the variation of the ON duty ratio (or OFF duty ratio) permits the rotor rotational angle $\theta$ to be variably controlled.

(4) Since the control off the power supply current flow to either or both of the coils 19 or 20 is carried out using the duty ratio signal S(D), the variation of the ON duty ratio (or OFF duty ratio) permits the rotor rotational angle $\theta$ to be variably controlled.

Thus, each magnetic saturation caused by the insufficient cross sectional areas in the respective magnetic circuits ($D_1$ and $D_2$) is not generated so that the linear positional variation characteristic with respect to the ON duty ratio (or OFF duty ratio) can be achieved as the variation characteristic of the rotor rotational angle $\theta$.

Next, other preferred embodiments will be described below with reference to the accompanied drawings. In these other embodiments, generally same reference numerals designate corresponding like elements in the first embodiment and, as viewed from the operating principle of the other preferred embodiments, the detailed explanations thereof are generally omitted.

Second Embodiment

Figure 6:
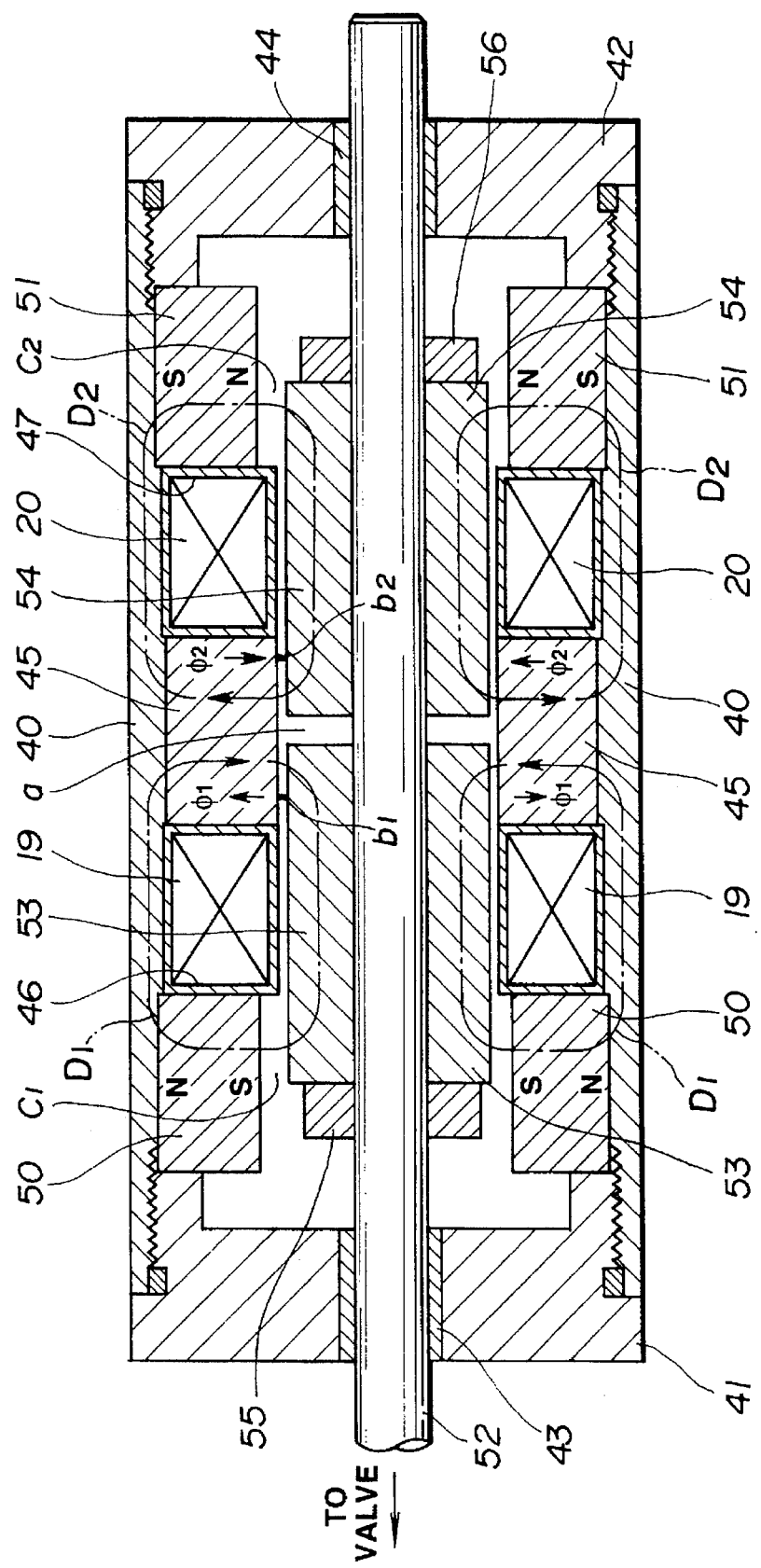
FIG. 6 is a cross sectional view of the actuating apparatus in a second preferred embodiment according to the present invention.

FIG. 6 shows the cross sectional view of the actuating apparatus of a linear actuation type in a second preferred embodiment according to the present invention.

It is noted that the present invention is applicable to a linear actuating apparatus in which the driven direction of the actuating apparatus is in a straight line direction although the driven direction of the actuating apparatus in the first embodiment is in the direction of rotation.

A cylindrical body yoke 40 is made of the ferromagnetic material, is formed in the cylindrical shape, and constitutes a part of the magnetic circuit.

Caps (encapsulations) 41 and 42 are made of the non-magnetic materials, are provided with axial center holes penetrated so as to pass a shaft member 52 therethrough, and are screwed into both end openings of the cylindrical body yoke 40.

Bushings (or called (rubber) bushes) 43 and 44 are pressurized and fitted into the axial center holes of both caps 41 and 42.

Inner diameters of the cylindrical body yoke 40 are as follows: a smallest inner diameter hole is formed on a center portion of the body yoke 40 in its axial direction, intermediate inner diameter holes are formed on respective end portions of the center smallest inner diameter hole in its axial direction of the body yoke 40, and largest inner diameter holes is formed on respective most end portions of the cylindrical body yoke 40 in its axial direction in a stepwise manner.

An annular stator 45 is pressurized and fitted onto the smallest inner diameter hole at the center portion of the body yoke 40.

The pair of coils 19 and 20 are wound around respective insulating bobbins 46 and 47 which are pressurized and fitted onto the intermediate inner diameter portions of the body yoke 40. The coils 19 and 20 are connected to the coil drive circuit as shown in FIG. 3. A pair of coils 19 and 20 are wound around respective insulating bobbins 46 and 47 which are pressurized and fitted onto the intermediate inner diameter portions of the body yoke 40. The coils 11 and 20 are connected to the coil drive circuit as shown in FIG. 3. A pair of annular permanent magnets 50 and 51 are pressurized and fitted onto the respective largest inner diameter portions of the cylindrical body yoke 40.

The control of the power supply current to either or both of the coils 19 and 20 is carried out on the basis of the duty ratio signal S(D) of the coil drive circuit shown in FIG. 3 in the same way as described in the first embodiment.

It is noted that the left-handed permanent magnet 50 is two-pole magnetized in the radial direction thereof such that that N pole is formed on its outer peripheral end surface and S pole is formed on its inner peripheral end surface. On the other hand, the right-handed permanent magnet is two-pole magnetized in the radial direction thereof such that S pole is formed on its outer peripheral surface and N pole is formed on its inner peripheral surface.

Next, the driven member B in the second embodiment shown in FIG. 6 will be described in details below.

A pair of left and right annular plunger yokes 53 and 54 are fixed onto the outer peripheral surface of a cylindrical shaft member (also, merely called shaft) 52 in an row order as shown in FIG. 6. The pair of the plunger yokes 53 and 54 are made of the ferromagnetic materials and the shaft member 52 is made of the non-magnetic material.

An annular gap denoted by a (corresponding to the first gap) is formed between mutually faced inner surfaces of the plunger yokes 53 and 54 so that both plunger yokes 53 and 54 are magnetically separated from each other (serves to magnetically shield (branch) the magnetic fluxes between the left-handed and right-handed plunger yokes 53 and 54).

Annular stoppers 55 and 56 (made of the nonmagnetic materials) used to hold the plunger yokes 53 and 54 are fixed onto both end portions of the plunger yokes 53 and 54.

Outer peripheral end surfaces (corresponding to first and third end surfaces) located at the mutually inner sides of the respective plunger yokes 53 and 54 are faced against the inner peripheral surface (corresponding to the first and third end surfaces) of the inner peripheral surface of the stator 45 via predetermined small gaps $b_1$ and $b_2$ (corresponding to the second and third gaps). In addition, the outer peripheral surfaces located at the outer sides of the respective plunger yokes 53 and 54 are formed against the inner end surfaces of the inner peripheral surfaces of both permanent magnets 50 and 51 via predetermined small gaps $c_1$ and $c_2$ (corresponding to the fourth and fifth gaps).

Both ends of the shaft member 52 are axially supported on the bushings 43 and 44 so as to be enabled to slide in the axial direction of the shaft member 52.

The left-handed permanent magnet 50 generates the magnetic flux in such a circular direction denoted by the dot-and-dash lines with the arrow marks as follows: generated from the N pole of the permanent magnet 50, passes through the body yoke 40, passes through the stator 45 and the predetermined gap $b_1$, and passes through the left-handed plunger yoke 58 and the predetermined gap $C_1$, and returns to the left-handed permanent magnet 50 so as to form the first magnetic circuit $D_1$ (refer to the left-handed dot-and-dash lines of FIG. 6).

In addition, the magnetic flux generated by the right-handed permanent magnet 51 passes through the predetermined gap $c_2$, flows into the right-handed plunger yoke 54, passes through the small gap $b_2$, passes through the stator 45, and returns into the right-handed permanent magnet 51 so as to form the second magnetic circuit $D_2$(refer to the right-handed dot-and-dash lines of FIG. 6).

The flowing directions of both magnetic fluxes in the magnetic circuits $D_1$ and $D_2$ are mutually opposite to each other at the stator 45.

The returning torque to return the shaft member 52 to its neutral stable position (the state as shown in FIG. 6) is always acted upon the shaft member 52, the neutral stable position being such that the areas of both small gaps $b_1$ and $b_2$ formed on the mutually faced surfaces of the respective plunger yokes 53 and 54 and the stator 45 (small gaps $c_1$ and $c_2$ formed on the mutually faced surfaces of the pair of the plunger yokes 53 and 54 and the pair of the permanent magnets 50 and 51) are mutually the same.

Then, the duty ratio control for the duty ratio signal S(D) to the power supply current flowing through both coils 19 and 20 causes the generation of the new magnetic flux $\phi_1$ or $\phi_2$ within the stator 45 in either direction with respect to the magnetic flux flowing through either of the first or second magnetic circuit $D_1$ or $D_2$. At this time, one of the magnetic fluxes flowing through either of the first or second magnetic circuit $D_1$ or $D_2$ is strengthened by the new magnetic flux in the same direction but is weakened by that in the opposite direction.

Consequently, strengths of both magnetic fluxes in the first and second magnetic circuits $D_1$ and $D_2$ become unbalanced and the magnetic resistances in both of the first and second magnetic circuits $D_1$ and $D_2$ under the condition wherein the areas of the mutually faced surfaces against the small gaps $b_1$ and $b_2$ (gap areas) are mutually the same become unbalanced. Hence, the propelling force to drive the driven member B up to a position in the axial direction wherein the magnetic resistances become again balanced is acted upon the driven member B. This propelling force causes the driven member B to drive the driven member B up to a predetermined position and permits the driven member B to be held at the predetermined position.

That is to say, in the actuating apparatus in the second embodiment, the drive direction only is different from the rotation direction of the actuating apparatus in the first embodiment. The same advantages as the first embodiment can be achieved in the second embodiment.

Each annular permanent magnet 50 and 51 may be divided into a plurality of permanent magnets in its circumferential direction or may be installed partially over its circumferential direction so as to form the corresponding magnetic circuit. In this case, since the manufacturing of the permanent magnets is easy, the manufacturing cost can accordingly be reduced.

Figure 7:
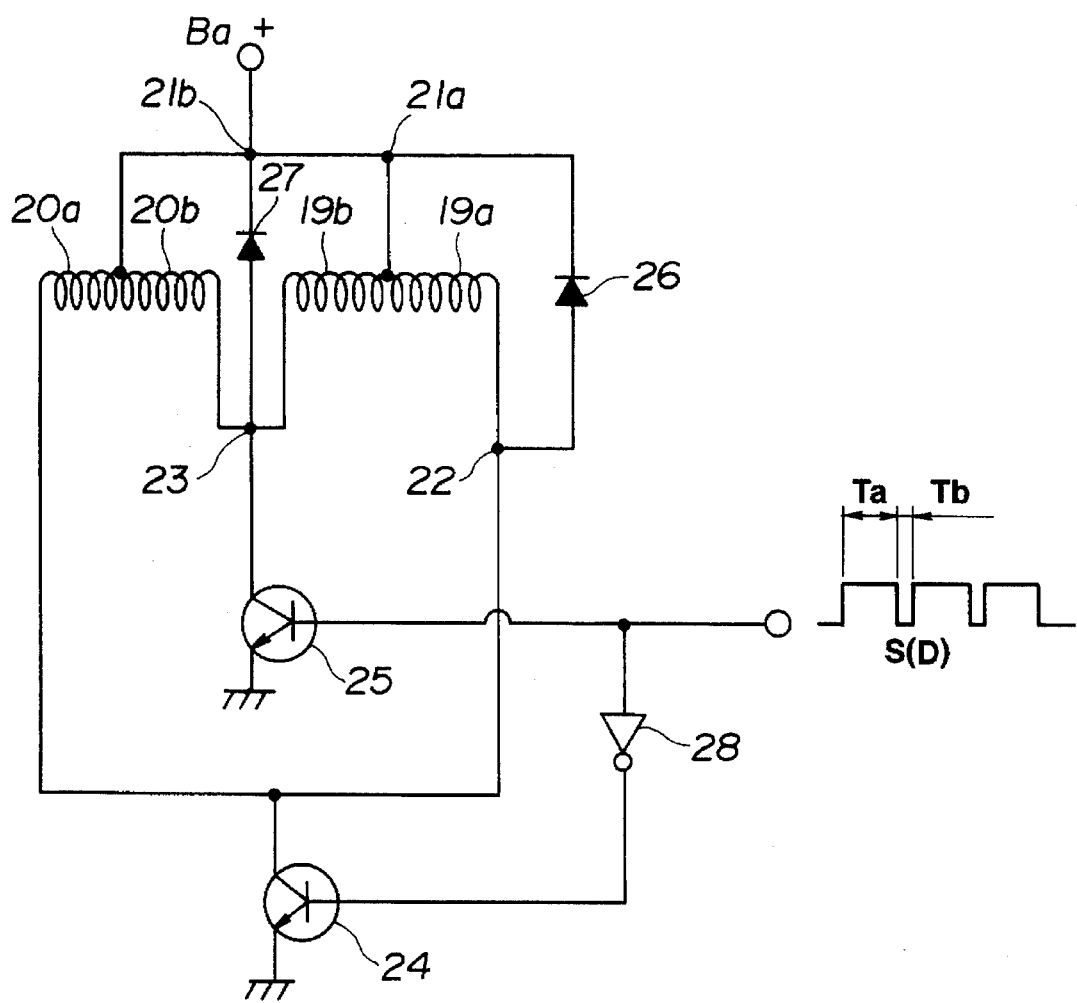
FIG. 7 is an electrical circuit diagram of another example of the coil drive circuit used in the first and second preferred embodiments.

FIG. 7 shows another example of the coil drive circuit applicable to the coils (19 and 20) wound around the insulating bobbins 46 and 47 described in the second embodiment.

As shown in FIG. 7, an intermediate tap of each coil 19 and 20 is connected to a corresponding one of the terminals 21a or 21b so that each coil 19 and 20 is divided into two serially wound coils 19a and 19b and 20a and 20b. The winding end portion of the coil 19a is connected to the plus pole of the battery Ba via the terminal 21b and the winding start portion of the other coil 20b is connected to the plus pole via the terminal 21b. The winding start portion of the coil 20a is connected to the collector of the NPN transistor 24. The winding end portion of the coil 20b is connected to the NPN transistor 25 together with the winding start portion of the coil 19b. The winding start portion of the coil 19a is connected to the collector of the NPN transistor 24. The freewheel diodes 26 and 27 are connected across the terminals 21b and 23 and across the terminals 21a and 22, respectively.

In the alternative of the second embodiment shown in FIG. 7, the two coils 19a and 19b wound around the insulating bobbin 46 and the two coils 20a and 20b wound around the insulating bobbin 47 generate mutually different direction magnetic fluxes in the stator 45.

The present invention is not limited to the first and second preferred embodiments.

For example, in the actuating apparatus in each of the first and second embodiments, while one of the areas of the above-described small gaps $c_1$ and $c_2$ is increased and the other of those of the gaps $c_1$ and $c_2$ is simultaneously decreased. However, only one of the areas may be decreased. Or alternatively, neither of those areas may be varied as shown in FIG. 8.

Figure 8:
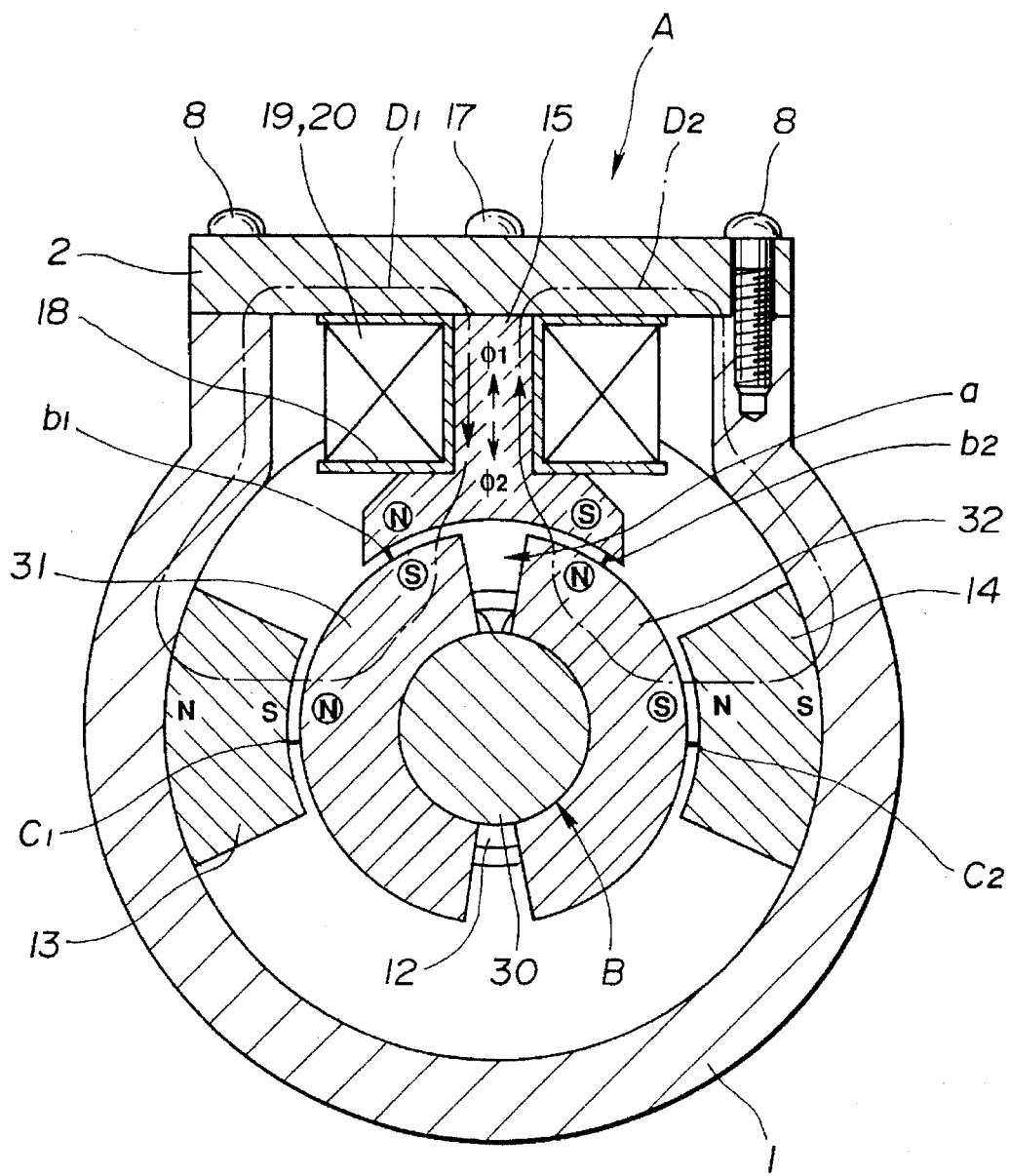
FIG. 8 is a cross sectional view of the actuating apparatus of a modification of the first embodiment shown in FIGS. 1 and 2.

FIG. 8 shows a cross sectional view of the actuating apparatus in a modification of the first embodiment.

The difference between FIG. 1 and FIG. 8 is that as shown in FIG. 8, a (lower side) small gap having the width generally equal to the first gap a is provided in the opposite direction to the small first gap a with respect to the axial center of the rotor shaft 30. The term of the opposite used in the specification means (about) 180° opposite.

Although two coils 19 and 20 are wound around the insulating bobbin 18 or bobbins 46 and 47 so as to operatively generate the new magnetic fluxes in mutually opposite directions, only one coil may be wound. In this case, the driven range of the driven member B may be halved as compared with the case of the first embodiment.

Although in each of the first and second embodiments the aerial small gap a serves to magnetically separate the magnetic fluxes generated in the stator, a member made of the non-magnetic material (a different permeability from the permeability of the aerial gap) may alternatively be inserted in the aerial small gap a so as to considerably separate the magnetic fluxes in the rotor yokes or plungers described in the first or second embodiment.

Third Embodiment

Figure 9:
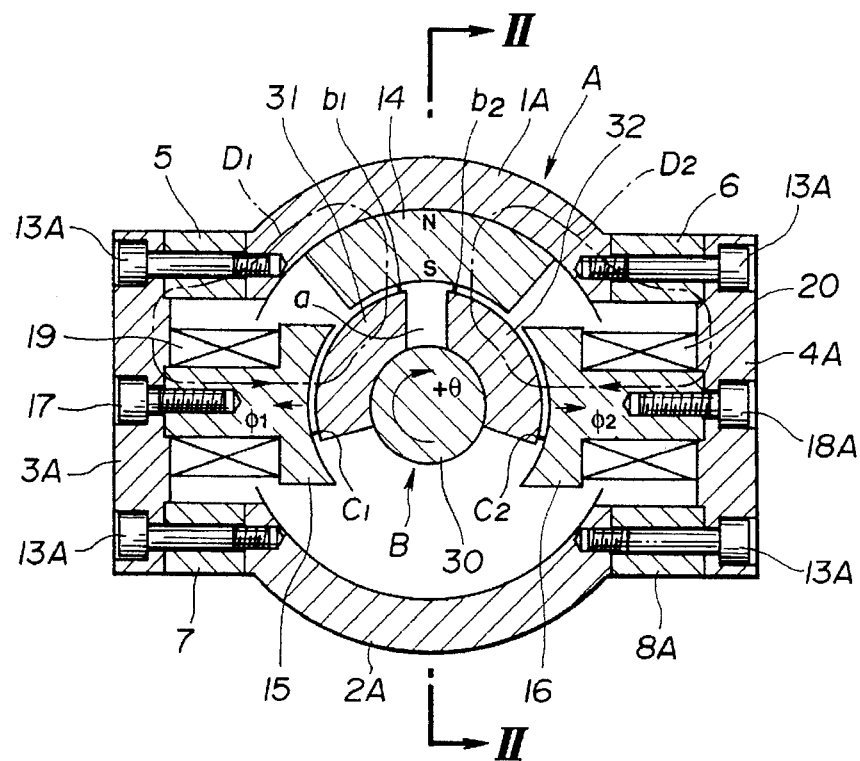
FIG. 9 is a cross sectional view of the actuating apparatus in a third preferred embodiment according to the present invention cut away along a line of I—I of FIG. 10.
Figure 10:
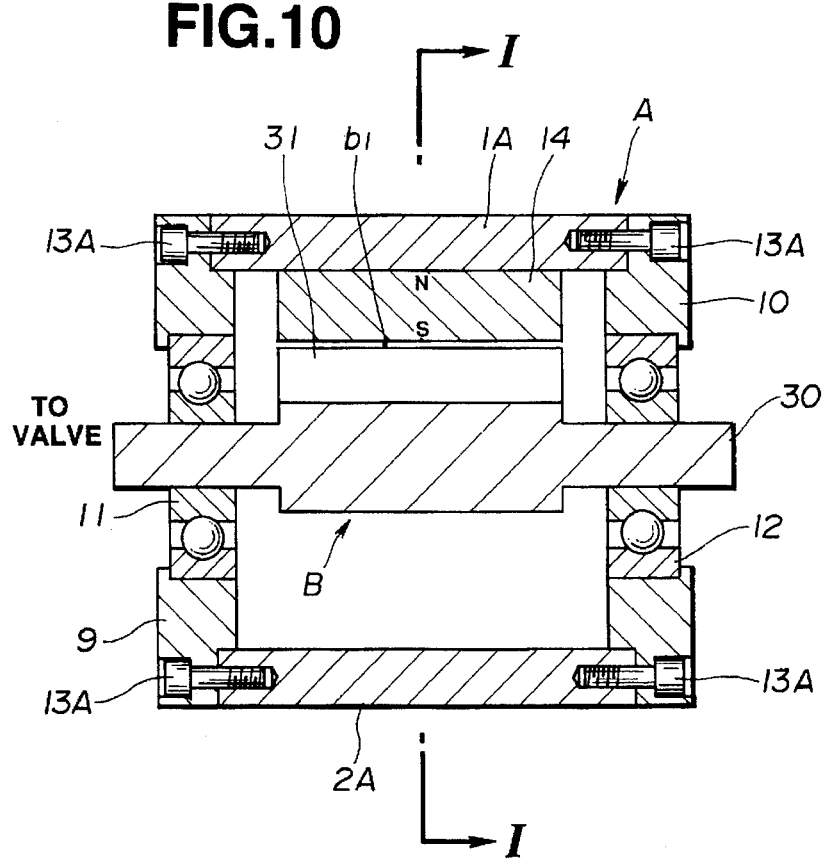
FIG. 10 is a cross sectional view of the actuating apparatus in the third embodiment cut away along a line of II—II of FIG. 9.

FIG. 9 shows a cross sectional view of the actuating apparatus in a third preferred embodiment cut away along the line of I—I of FIG. 10.

FIG. 10 shows the cross sectional view of the actuating apparatus in the third embodiment cut away along the line of II—II of FIG. 9.

The structure of the stationary member A will first be described below.

In the third embodiment, the yoke portion of the generally cylindrical shape is formed with a pair of upper and lower arc-shaped body yokes 1A and 2A (made of the ferromagnetic materials), a pair of left and right stator yokes 3A and 4A, and linkage yokes 5, 6, 7, and 8A linking respective ends of each yoke 1A, 2A, 3A, and 4A. The caps 9 and 10 are installed on the respective end openings of the cylindrical yoke portion.

In FIGS. 9 and 10, screws 13A are inserted so as to serve to link each member of the stationary member A.

In the third embodiment, a single permanent yoke 14 is adhered onto the inner peripheral surface of the upper arc-shaped body yoke 1. The permanent magnet 14 is two-pole magnetized in the radial direction of the cylindrical yoke portion. The ferrite magnet is used as the permanent magnet 14. The inner peripheral surface of the permanent magnet 14 is formed in the arc shape with the axial center of the cylindrical yoke portion as a center. The outer peripheral surface of the permanent magnet 14 is magnetized as N pole and the inner peripheral surface thereof is magnetized as S pole.

A pair of left and right stators 15 and 16 are screwed and fixed to the inner surface of the left and right stator yokes 3A and 4A and separated from the permanent magnet 14 at approximately right angles to the permanent magnet 14 as appreciated from FIG. 9, respectively.

The inner peripheral surfaces of the pair of left and right stators 15 and 16 made of the ferromagnetic materials are formed in the arc shapes with the axial center of the cylindrical yoke portion as the center in the same manner as the permanent magnet 14. In the third embodiment, the coils 19 and 20 are respectively wound around the left and right stators 15 and 16 so as to operatively generate the new magnetic fluxes in the radial direction of the corresponding stators 15 and 18 via insulating coatings (not shown but the insulating bobbins may be interposed between the corresponding stators and coils).

Next, the structure of the driven member B in the third embodiment will be described below.

In the same way as described in the first embodiment shown in FIG. 1, the pair of rotor yokes 31 and 32 are adhered onto the outer peripheral surface or the rotor shaft 30 with the small gap a provided between the side end surfaces of the rotor yokes 31 and 32.

The small gaps $b_1$ and $b_2$ are provided between the rotor yokes 31 and 32 and the inner peripheral surface of the permanent magnet 14, as appreciated from to FIG. 9.

The small gaps $c_1$ and $c_2$ are provided between the inner peripheral surfaces of the left and right stators 15 and 16 and the parts of the outer peripheral surfaces of the rotor yokes 31 and 32, as appreciated from FIG. 9.

The first magnetic circuit (path) $D_1$ is formed, as denoted by the dot-and-dash line of FIG. 9, which passes from the permanent magnet 14, passes through the upper yoke 1A, the linkage yoke 5, the left-handed stator yoke 3A, the small gap $c_1$, and left rotor yoke 31, and returns to the permanent magnet 14 via the small gap $b_1$.

On the other hand, the second magnetic circuit (path) $D_2$ is formed, symmetrically to the first magnetic circuit $D_1$ as denoted by the dot-and-dash line of FIG. 9, which passes from the permanent magnet 14, passes through the left sided upper yoke 1A, the right-handed linkage yoke 6, the right-handed stator yoke 4A, the right-handed stator yoke 16, the small gap $c_2$, the right-handed rotor yoke 32, and the small gap $b_2$ and returns to the permanent magnet 14 via the small gap $b_2$.

Therefore, the direction of the magnetic flux flowing through the first magnetic circuit $D_1$ is opposite to that of the magnetic flux flowing through the second magnetic circuit $D_2$ at each stator 15 and 16, as appreciated from FIG. 1.

The coil drive circuit for the coils 19 and 20 shown in FIG. 3 (in the case of the first embodiment) is applied to the coils 19 and 20 in the third embodiment.

The operation of the third embodiment is generally the same as described in the third embodiment in the case of the no power supply current flow into the coils 19 and 20 (1) and in the case of the power supply current flow into either of the coils using the duty ratio signal S(D) as shown in FIG. 3. It is noted that the other coil drive circuit shown in FIG. 7 is also applied to the coils 19 and 20 in the third embodiment.

Therefore, the detailed explanation of the third embodiment is omitted herein.

The characteristics of the returning torques T shown in FIGS. 4 and 5 are applied to the third embodiment shown in FIGS. 9 and 10.

Figure 11:
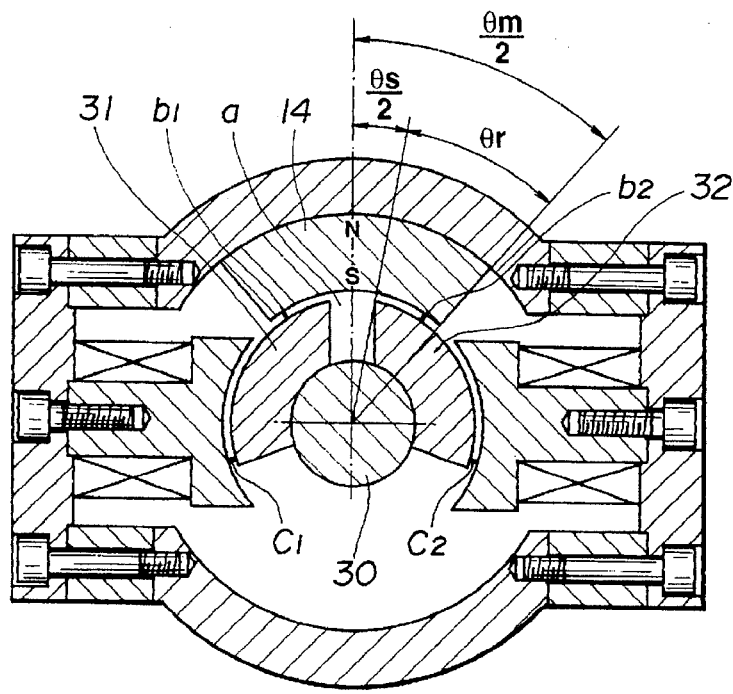
FIG. 11 is an explanatory cross sectional view of the actuating apparatus in the third embodiment for explaining both small gap portions ($b_1$ and $b_2$) and a length in a rotational angular direction in terms of angles in the actuating apparatus of the third embodiment.

FIG. 11 shows an explanatory view for explaining a ratio between lengths in the rotational direction of the small gaps $b_1$ and $b_2$ and of the small gap a in the third embodiment in terms of the rotational angle of the rotor shaft 30.

As shown in FIG. 11, suppose that the driven member B is placed at the neutral stable position (the state shown in FIG. 9). Suppose then that the rotational angle of the rotor shaft 30 is $\theta_o$, the angle of the arc-shaped inner surface of the permanent magnet 14 is $\theta_m$, the angle of the gap a is $\theta_s$, and the angle of the small gap $b_2$ is $\theta_r$ ($\theta_r = \theta_m/2 - \theta_s/2$).

It is desirable for the angle $\theta_s$ of the small gap a to be set in a range from 10° to 20° as viewed from the branch of the magnetic flux of the permanent magnet 14 into two as shown in FIG. 9.

It is desirable for a difference of the rotational angle $\theta_r$ of the small gap $b_2$ from a half of the rotational angle range $\theta_o$ (namely, $\theta_r - \theta_o/2$) to be set in a range from 5° to 10° in terms of the achievements of the linear torque variable characteristic within the rotational range of $\theta_o$ of the rotor shaft 30 (refer to FIG. 5) and the linear torque variable characteristic of the rotor rotational angle $\theta$ with respect to the duty ratio (ON duty ratio or OFF duty ratio) (refer to FIG. 4).

The advantages of the third embodiment are generally the same as described above in the first and second preferred embodiments.

In addition, since the coils 19 and 20 are respectively wound around both of the pair of left and right stators 15 and 16, a wider rotor rotational angle $\theta_o$ can be achieved.

Fourth Embodiment

Figure 12:
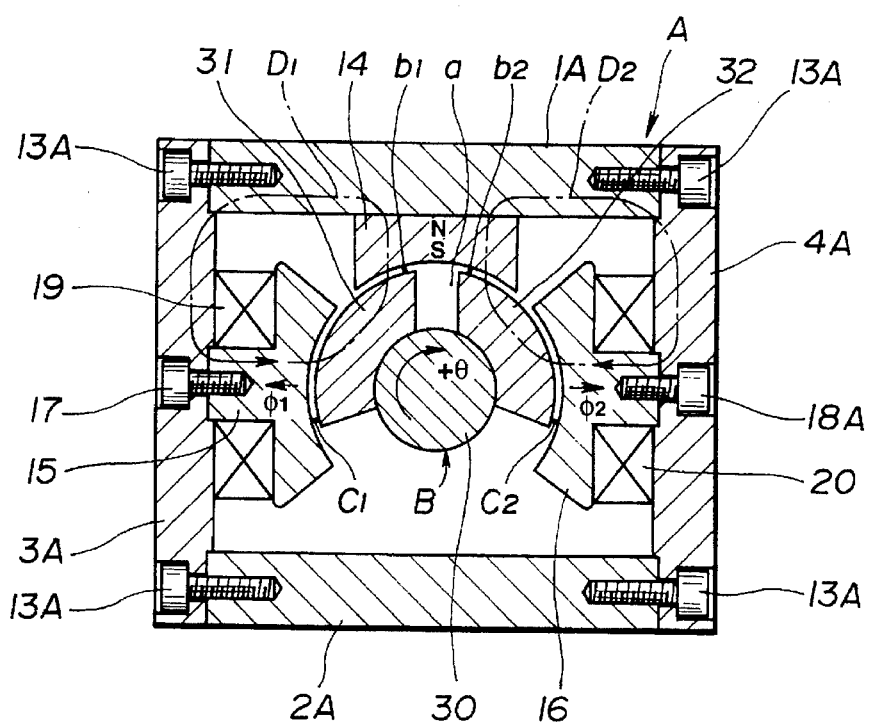
FIG. 12 is a cross sectional view of the actuating apparatus in a fourth preferred embodiment.

FIG. 12 shows a cross sectional view of the actuating apparatus in a fourth preferred embodiment according to the present invention.

Although the structure and the operation of the fourth embodiment shown in FIG. 12 is generally the same as those described in the third embodiment (first embodiment), the body yokes 1A and 2A are formed in flat, plate-like shapes so that the linkage yokes 5, 6, 7, and 8A shown in FIG. 9 are omitted. The same reference numerals correspond to the like elements in the case of the third embodiment and the details explanations of the structure and operation are omitted herein. The same advantages in the case of the third embodiment can be achieved.

Fifth Embodiment

Figure 13:
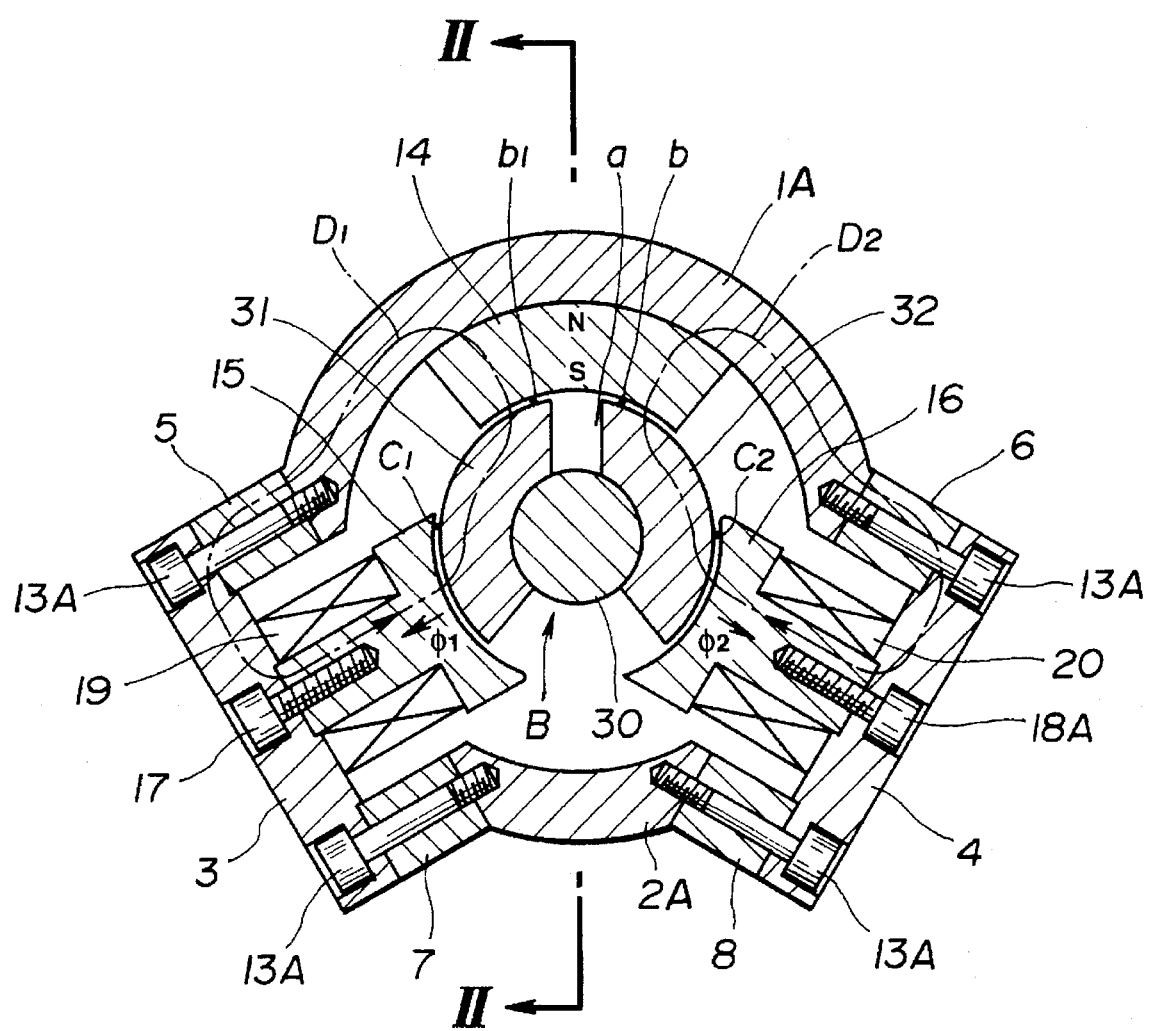
FIG. 13 is a cross sectional view of the actuating apparatus in a fifth preferred embodiment cut away along a line I—I of FIG. 14.
Figure 14:
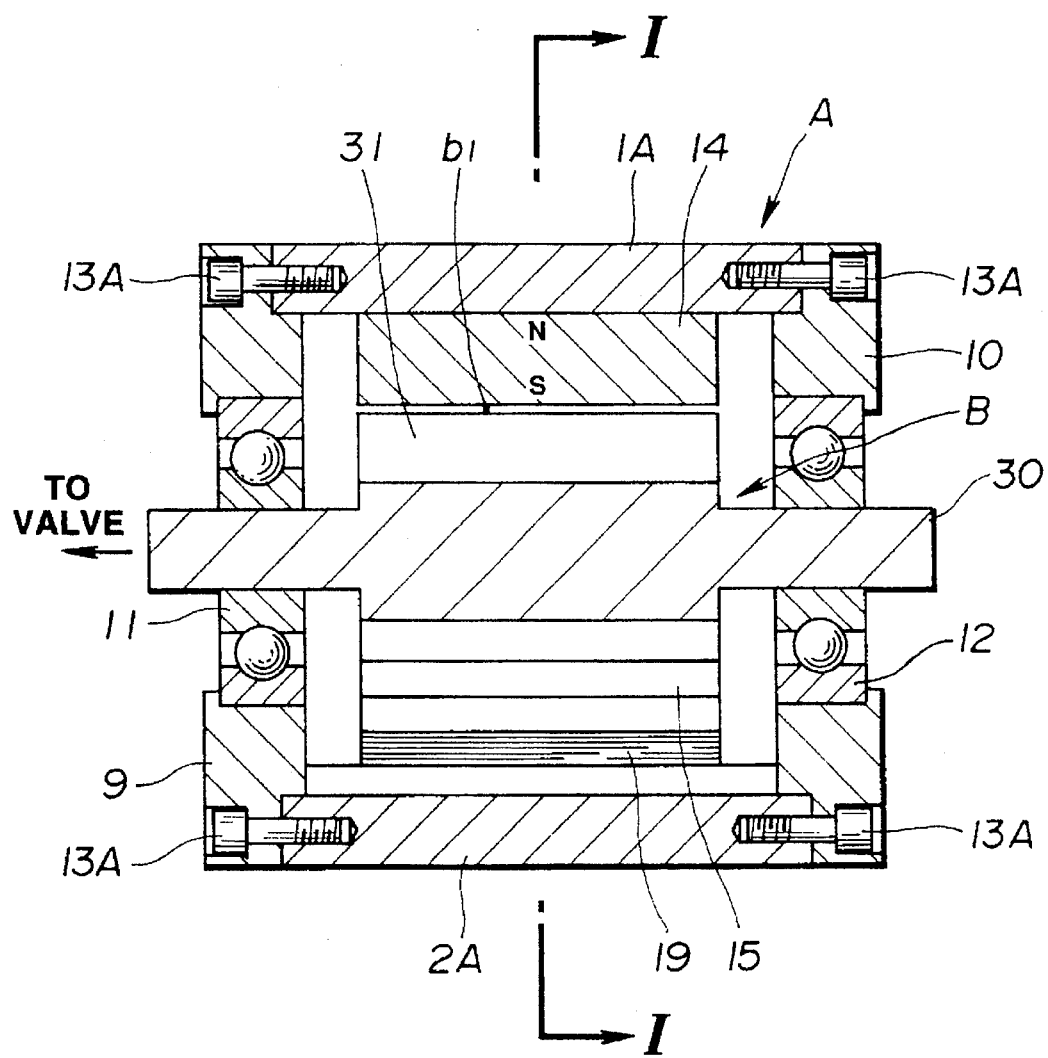
FIG. 14 is a cross sectional view of the actuating apparatus in the fifth embodiment cut away along a line of II—II of FIG. 13.

FIGS. 13 shows a cross sectional view of the actuating apparatus in a fifth preferred embodiment according to the present invention cut away along the line I—I of FIG. 14.

FIG. 14 shows the cross sectional view of the actuating apparatus in the fifth embodiment cut way along the line II—II of FIG. 13.

As typically appreciated from FIG. 13, a ratio of the lengths in the circumferential direction between the upper body yoke 1A and the lower body yoke 2A is varied, as compared with the upper and lower body yokes 1A and 2A in the third embodiment of FIGS. 9 and 10, so that the length thereof in the case of the upper body yoke 1A is longer than that in the case of the lower body yoke 2A. The fifth embodiment teaches that it is not necessary for the positions of both of the pair of right and left stators 15 and 16 to be placed at the positions of FIG. 9 by 90° (orthogonal as shown in FIG. 9) with respect to the position of the permanent magnet 14.

Hence, the same advantages as described in the third embodiment (first embodiment) can also be achieved in the fifth embodiment. In addition, a spatial interval between both of the stators 15 and 16 is widened so that the rotor rotational angle $\theta_o$ of the rotor shaft 30 can be widened according to the setting of the dimensions of the respective members shown in FIGS. 13 and 14.

Sixth Embodiment

Figure 15:
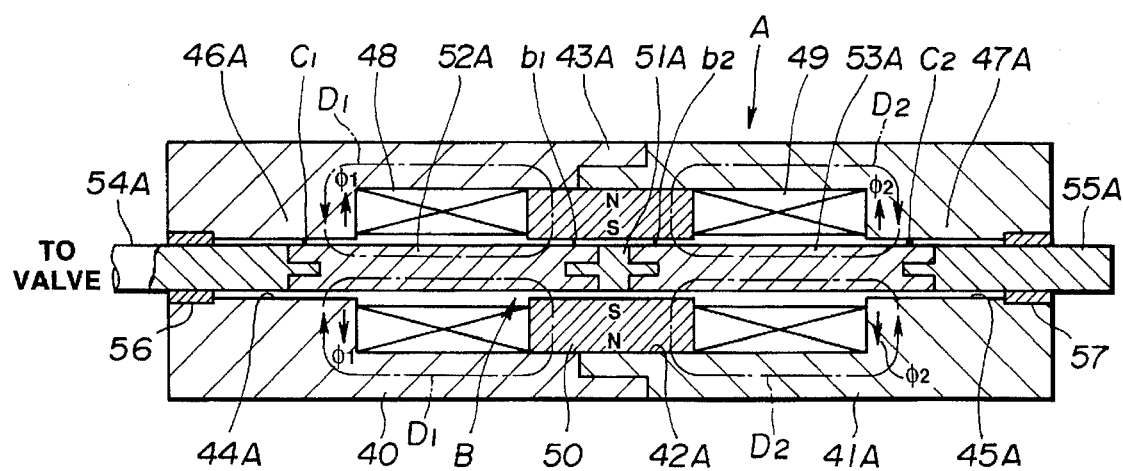
FIG. 15 is a cross sectional view of the actuating apparatus in a sixth preferred embodiment according to the present invention.

FIG. 15 shows the cross sectional view of the actuating apparatus in a sixth preferred embodiment according to the present invention as the linear actuator type generally similar to the second embodiment shown in FIG. 6.

In FIG. 15, a pair of left and right cylindrical body yokes 40 and 41A (made of the ferromagnetic materials) are formed on the stationary member A and engaged with each other in their axial directions so as to be integrated into one body yoke. An intermediate portion of the integrated body yokes 40 and 41A constitute a larger inner diameter hole 42A at which thin passages of the two magnetic circuits $D_1$ and $D_2$ are formed.

In addition, inner sides of both end portions of the integrated body yokes 40 and 41A are formed with small inner diameter holes 44A and 45A so as to constitute thick stators 46A and 47A.

The pair of coils 48 and 49 are wound on both ends of the larger inner diameter hole 42 and an annular permanent magnet 50 is inserted into the center portion of the larger diameter hole 42 between both of the coils 48 and 49. The inner peripheral surface of the permanent magnet 50 is magnetized as the S pole and the outer peripheral surface of the permanent magnet 50 is magnetized as the N pole.

The structure of the driven member B in the sixth embodiment will be described below.

A pair of left and right plunger yokes 52A and 53A (made of the ferromagnetic materials) are integrated and fixed together at both side ends of a plunger center yoke 51A made of the non-magnetic material.

A pair of left and right plunger side yokes 54A and 55A (made of the non-magnetic materials) are integrated and fixed to respective outer ends of both plunger yokes 52A and 53A. The plunger yokes 52A and 53A, the plunger center yoke 51A, and the plunger side yokes 54A and 55A constitute the cylindrically shaped driven member B.

The outer peripheral surfaces of the respective plunger yokes 52A and 53A located at the integrated portions thereof are faced against the inner peripheral surface of the permanent magnet 50 via the small gaps $b_1$ and $b_2$, as shown in FIG. 15.

In addition, the outer peripheral surfaces of the respective plunger yokes 52A and 53A located at the outer ends thereof are faced against inner ends of smaller diameter holes 44A and 45A which are inner surfaces of the respective stators 46A and 47A via the small gaps $c_1$ and $c_2$, as shown in FIG. 15.

Furthermore, the plunger side yokes 54A and 55A are slidably supported in its axial direction by means of the bushings 56 and 57 attached onto the outer ends of the smaller inner diameter holes 44A and 45A, as shown in FIG. 15.

The magnetic flux generated by the permanent magnet 50 is branched into two magnetic fluxes flowing through the branched magnetic circuits, namely, the first and second magnetic circuits $D_1$ and $D_2$.

The first magnetic circuit $D_1$ passes a branched magnetic passage 43A, the left-handed stator 46A, the small gap $c_1$, the left-handed plunger yoke 52A, and the small gap $b_1$ and returns to the permanent magnet 50, as denoted by the dot-and-dash line shown in FIG. 15.

The second magnetic circuit $D_2$ passes the branched magnetic passage 43A, the right-handed stator 47A, the small gap $c_2$, the right-handed plunger yoke and the small gap $b_2$ and returns to the permanent magnet 50, as denoted by the dot-and-dash line shown in FIG. 15.

Hence, the returning torque (propelling force) to return the driven member B to its neutral stable position (the state shown in FIG. 15) is always acted upon the driven member B. The neutral stable position is, as described above, the position at which the areas of both small gaps $b_1$ and $b_2$ formed between the mutually faced surfaces of the respective plunger yokes 52A and 53A and the permanent magnet 50 are mutually the same (the areas of the small gaps $c_1$ and $c_2$ formed between the respective stators 46A and 47A and the respective plunger yokes 52A and 53A are mutually the same).

The duty ratio control for the power supply current flow into either or both of the pair of coils 48 and 49 causes the control of the strengths of the new magnetic fluxes generated by either or both of the coils 48 and 49 which are opposite to the directions of the magnetic fluxes in the first and second magnetic circuits $D_1$ and $D_2$ so that the driven member B can be driven to move linearly toward the axial direction thereof and the driven member B can be held at the moved position.

The advantages of the sixth embodiment are generally the same as those described in the second embodiment.

Figure 16:
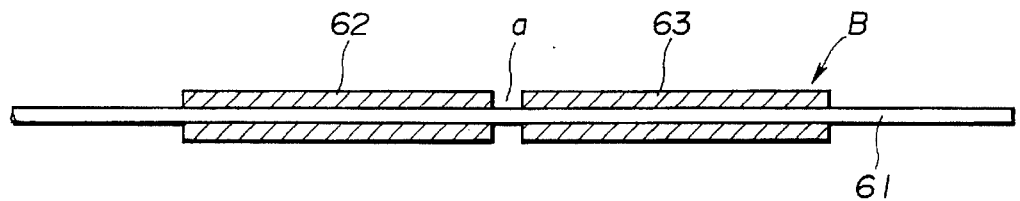
FIG. 16 is another example of a driven member in the actuating apparatus in the sixth embodiment according to the present invention.

FIG. 16 shows another example of the driven member B used in place of the driven member B shown in FIG. 15.

Figure 18:
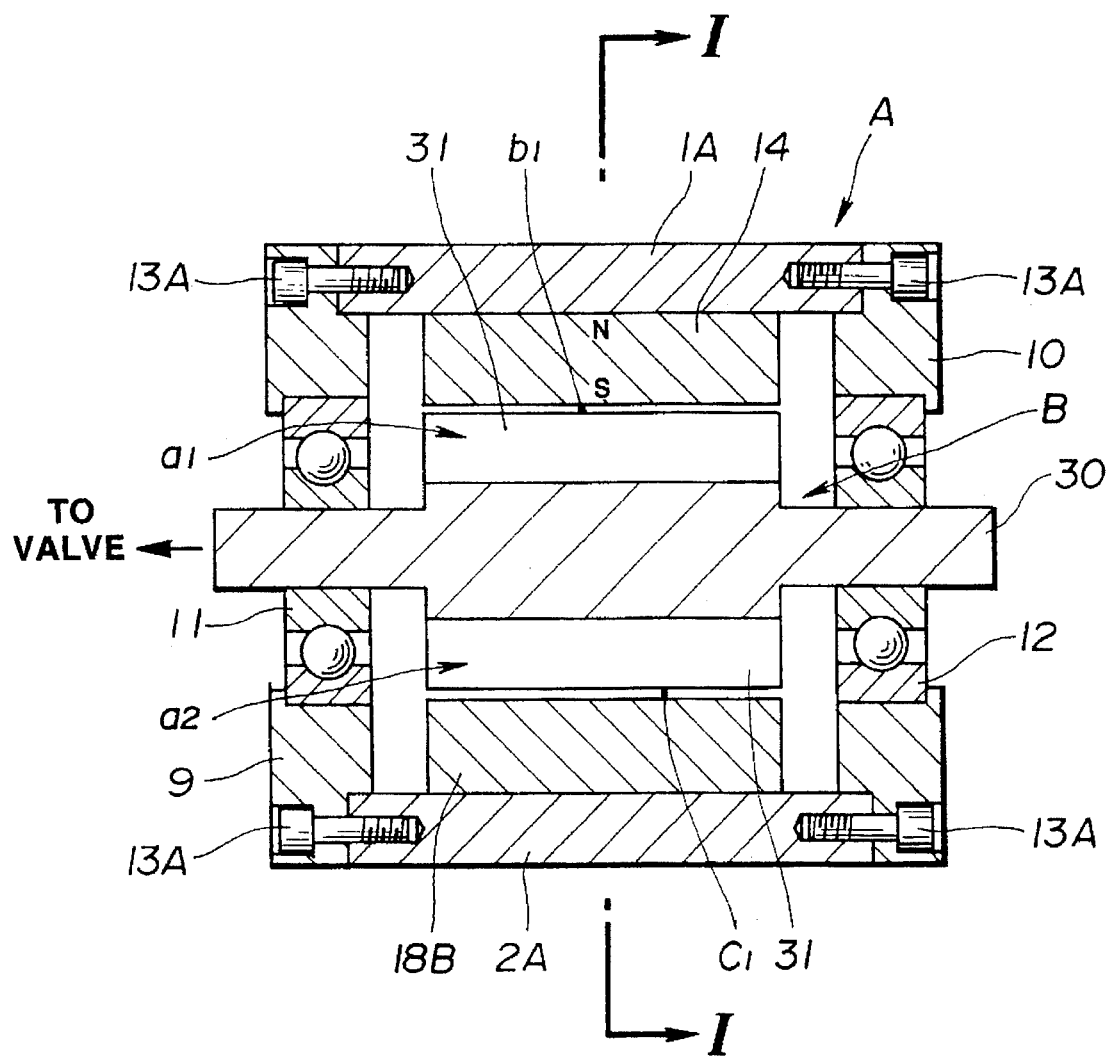
FIG. 18 is a cross sectional view of the actuating apparatus in the seventh embodiment according to the present invention cut away along the line of II—II of FIG. 17.

The driven member B, in this example, may include, as shown in FIG. 18, a shaft member 81 made of the non-magnetic material and a pair of left and right plunger yokes 62 and 63 attached around an outer peripheral surface of the shaft member.

Seventh Embodiment

Figure 17:
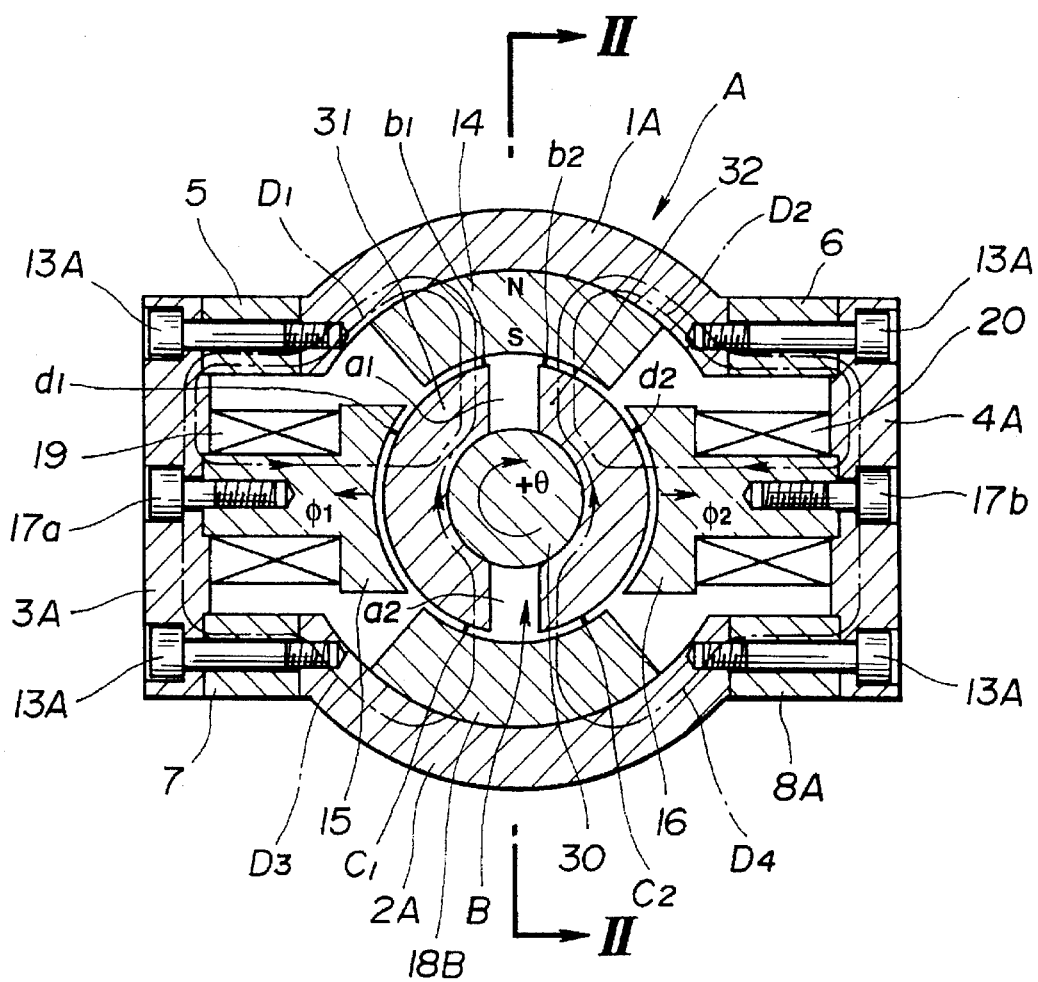
FIG. 17 is a cross sectional view of the actuating apparatus in a seventh embodiment according to the present invention cut away along a line of I—I of FIG. 18.

FIG. 17 shows a cross sectional view of the actuating apparatus in a seventh preferred embodiment according to the present invention cut away along the line I—I of FIG. 18.

FIG. 18 shows the cross sectional view of the actuating apparatus in the seventh embodiment cut away along the line of II—II of FIG. 17.

The structure of the stationary member A in the seventh embodiment will first be described below.

The cylindrically shaped yoke portion is formed with the pair of the upper and lower arc-shaped body yokes 1A and 2A made of the ferromagnetic materials, the pair of the left and right stator yokes 3A and 4A, and the linkage yokes 5, 6, 7, and 8A linking the ends of the respective yokes 1A, 2A, 3A, and 4A in the same way as described in the third embodiment.

In the seventh embodiment, the permanent magnet denoted by 14 of FIG. 17 is adhered onto the inner peripheral surface of the upper arc-shaped body yoke 1A. The permanent magnet 14 is two-pole magnetized in the same way as the permanent magnet 14 in the third embodiment.

In addition, in the seventh embodiment, another stator denoted by 18B of FIG. 17 having generally the same shape as the permanent magnet 14 is adhered onto the inner peripheral surface of the lower arc-shaped body yoke 2A at a symmetrical position to the permanent magnet 14 with the axial center of the cylindrical yoke portion (the rotor yoke 30) as the center.

The pair of stators 15 and 16 (made of the ferromagnetic materials) are fixed by means of the screws 17a and 17b onto the inner surfaces of both of the pair of left and right stator yokes 3A and 4A, respectively. The inner surfaces of both of the stators 15 and 16 are formed in the arc shapes with the axial center of the cylindrical yoke portion as the center in the same way as the permanent magnet 14.

The pair of the coils 19 and 20 are wound around the outer peripheral surfaces of the respective stators 15 and 16 in the same way as described in the third embodiment (shown in FIG. 9). The pair of the coils 19 and 20 serve to operatively generate the magnetic fluxes in the stators 15 and 16 in their radial directions.

The driven member B in the seventh embodiment includes: the rotor shaft 30; and the pair of rotor yokes 31 and 32.

The pair of the rotor yokes 31 and 32 are formed in generally semi-circular shapes and are made of the ferromagnetic materials.

As shown in FIG. 17, the aerial small gaps $a_1$ and $a_2$, each being wide enough to magnetically separate the magnetic fluxes faced against these small gaps $a_1$ and $a_2$, are provided between upper and lower outer surfaces of the respective yokes 31 and 32 and between the lower inner surfaces of the respective yokes 31 and 32, respectively.

The outer peripheral surfaces of both of the rotor yokes 31 and 32 adjacent to the small gap $a_1$ are faced against the inner peripheral surface in the arc shape of the permanent magnet 14 via the small gaps $b_1$ and $b_2$.

In addition, the outer peripheral surfaces of both of the rotor yokes 31 and 32 adjacent to the small gap $a_2$ are faced against the inner peripheral surface of the other stator 18B via the small gaps $c_1$ and $c_2$. Furthermore, the outer peripheral surfaces located on intermediate portions of both of the left and right stator yokes 31 and 32 are faced against the inner surfaces in the arc shapes of the respective stators 15 and 16 via the small gaps $d_1$ and $d_2$.

Hence, the magnetic flux generated by the permanent magnet 14 is branched into two within the upper body yoke 1A, one of the two branched magnetic fluxes passing through the left-handed linkage yoke 5, the left-handed stator yoke 3A, the left-handed stator 15, the small gap $d_1$, and the left-handed rotor yoke 81 and returning to the permanent magnet 14 via the small gap $b_1$ to form the first magnetic circuit $D_1$ and the other branched magnetic flux passing through the right-handed linkage yoke 6, the right-handed stator yoke 4A, the right-handed stator 16, and the small gap $d_2$ and returning to the permanent magnet 14 via the small gap $b_2$ to form the second magnetic circuit $D_2$, as denoted by the dot-and-dash lines of FIG. 17.

It is noted that in the seventh embodiment third and fourth magnetic circuits $D_3$ and $D_4$ are furthermore formed.

The magnetic flux generated by the permanent magnet 14 is branched into other two magnetic fluxes in the upper body yoke 1A, one of the other branched two magnetic fluxes passing through the left-handed linkage yoke 5, the left-handed stator yoke 3A, the left-handed lower linkage yoke 7, the other stator 18B, the small gap $c_1$, the left-handed rotor yoke 31, and the small gap $b_1$ and returning to the permanent magnet 14 to form the third magnetic circuit $D_3$ and the other magnetic flux passing through the right-handed linkage yoke 6, the right-handed stator yoke 4A, the right-handed lower linkage yoke 8A, the other stator 18B, the small gap $c_2$, the right-handed rotor yoke 32, and the small gap $b_2$ and returning to the permanent magnet 14 to form the fourth magnetic circuit $D_4$, as denoted by the dot-and-dash lines of FIG. 17.

The coil drive circuit (shown in FIG. 3 and FIG. 7) in the first embodiment is also applicable to the coils 19 and 20 in the seventh embodiment.

The power supply to the one coil 19 by the duty ratio signal S(D) causes the generation of the new magnetic flux $\phi_1$ in the direction which is the same as the third magnetic circuit $D_3$ but which is opposite to the first magnetic circuit $D_1$ and the power supply to the other coil 20 by the duty ratio signal S(D) causes the generation of the new magnetic flux $\phi_2$ in the direction which is the same as the fourth magnetic circuit $D_4$ but which is opposite to the second magnetic circuit $D_2$.

The operation of the actuating apparatus in the seventh embodiment is generally the same as the first embodiment described above. Therefore, the detailed explanations thereof will be omitted herein.

It is noted, in the seventh embodiment, that the power supply current flows into both coils 19 and 20 cause the generations of the new magnetic fluxes $\phi_1$ and $\phi_2$ in the respective stators 15 and 16 which are opposite (in the directions) to the magnetic flux flows of the first and second magnetic circuits $D_1$ and $D_2$ and are the same directions as the magnetic flux flows of the third and fourth magnetic circuits $D_3$ and $D_4$.

The new magnetic fluxes $\phi_1$ and $\phi_2$ weaken those in the first and second magnetic circuits $D_1$ and $D_2$ and strengthens those in the third and fourth magnetic circuits $D_3$ and $D_4$.

Hence, when the duty ratio signal S(D) indicates 50% (the OFF duty ratio is 50%) of the ON duty ratio and the strengths of both magnetic fluxes in the first and second magnetic circuits $D_1$ and $D_2$ and those in the third and fourth magnetic circuits $D_3$ and $D_4$ are maintained under the uniform conditions so that the rotor shaft 30 is held at the neutral stable position of the rotor rotational angle of $\theta=0°$ denoted by $R_2$ of FIG. 4.

The cases when the duty ratio signal indicates 100% of the ON duty ratio and when the duty ratio signal indicates 0% ON duty ratio are generally the same as those in the case of the first embodiment.

The advantages of the seventh embodiment are generally the same as described above in case of the second embodiment and in the case of the third embodiment except formations of the third and fourth magnetic circuits $D_3$ and $D_4$.

Figure 19:
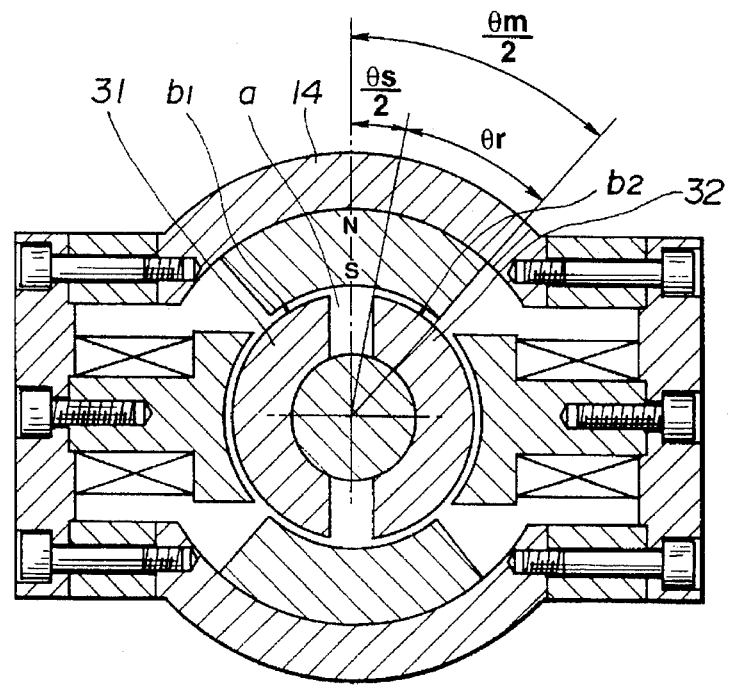
FIG. 19 is a cross sectional view of the actuating apparatus in the seventh embodiment according to the present invention for explaining both small gap portions ($b_1$ and $b_2$) and length of a rotational angular position in terms of the angles.

FIG. 19 shows the ratio of the lengths in the driven direction of the small gaps $b_1$, $b_2$, and $a_1$ in the case of the seventh embodiment.

It is noted that since the ratio of the lengths described in FIG. 19 is the same as that described in FIG. 11 in the case of the third embodiment, the detailed explanations thereof will be omitted herein.

Eighth Embodiment

Figure 20:
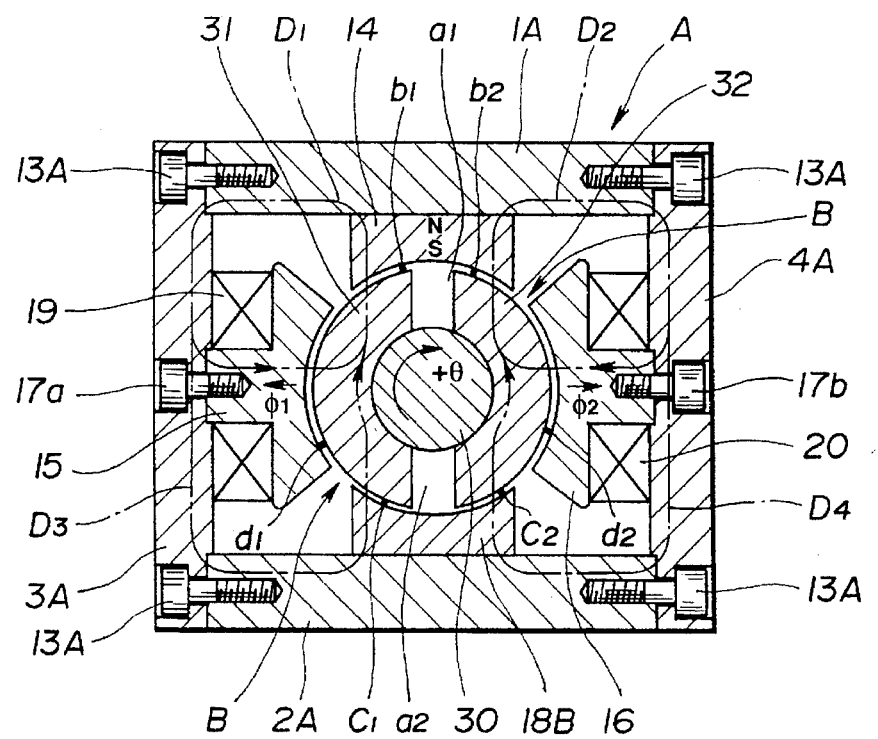
FIG. 20 is a cross sectional view of the actuating apparatus in an eighth embodiment according to the present invention.

FIG. 20 shows a cross sectional view of the actuating apparatus in an eighth preferred embodiment according to the preset invention.

In the eighth embodiment of FIG. 20, the upper and lower body yokes 1A and 2A are formed in flat, plate-like shapes as are different from the seventh embodiment so that the respective linkage yokes 5, 6, 7 and 8A are omitted in the eighth embodiment.

The operations and advantages of the eighth embodiment are the same as those in the case of the seventh embodiment.

Ninth Embodiment

Figure 21:
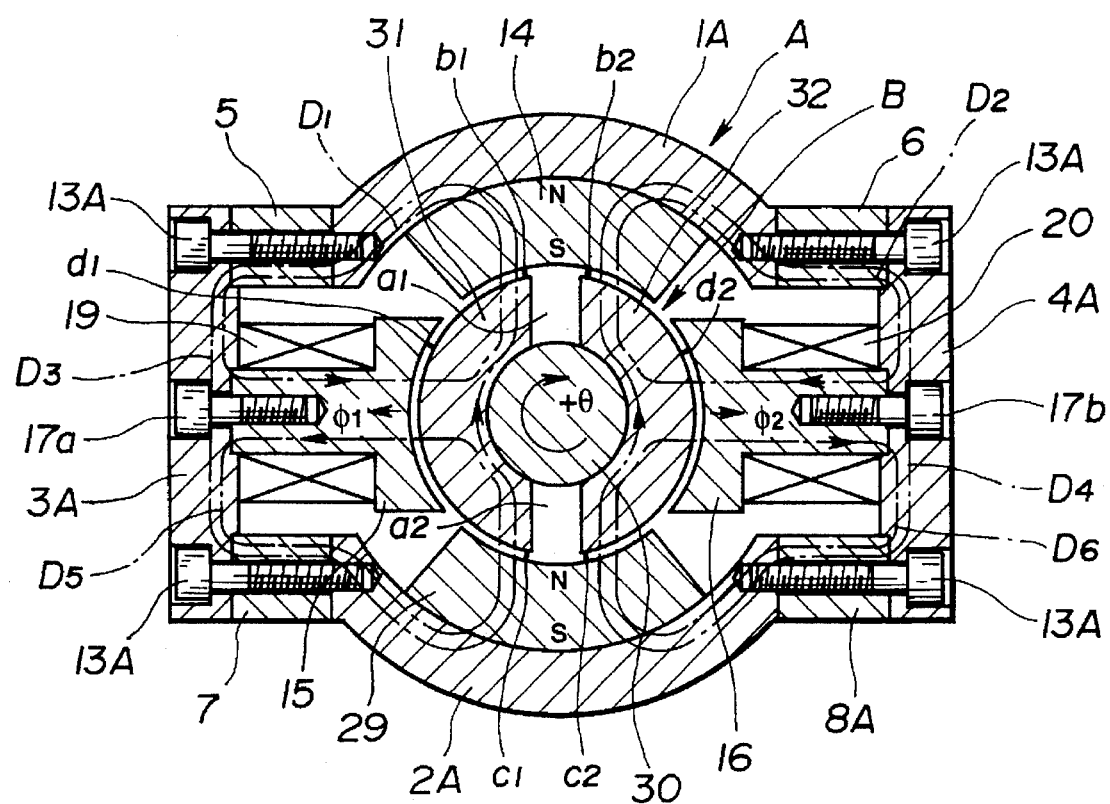
FIG. 21 is a cross sectional view of the actuating apparatus in a ninth embodiment according to the present invention.

FIG. 21 shows a cross sectional view of the actuating apparatus in a ninth preferred embodiment according to the present invention.

It is noted that, as shown in FIG. 21, in the actuating apparatus of the ninth embodiment, the stator 18B installed in the case of the seventh embodiment is replaced with a new permanent magnet 29 in the ninth embodiment.

The pole magnetized in the inner peripheral surface of the new permanent magnet 29 has a different polarity as that of the upper position permanent magnet 14, as shown in FIG. 21.

The new magnetic flux generated by the new (lower side) permanent magnet 29 causes formations of further new fifth and sixth magnetic circuits $D_5$ and $D_6$. The fifth magnetic circuit $D_5$ passes from the new permanent magnet 29 through the small gap $c_1$, the left-handed rotor yoke 31, the small gap $c_1$, the left-handed stator 15, the left-handed stator yoke 3A, the lower linkage yoke 7, and the lower body yoke 2A and returns to the new permanent magnet 29 as denoted by the dot-and-dash line of FIG. 21.

On the other hand, the sixth magnetic circuit $D_6$ passes from the new permanent magnet 29 through the small gap $c_2$, the right-handed rotor yoke 32, the right-handed stator 16, the right-handed stator yoke 4A, the lower linkage yoke 8A and returns to the new permanent magnet 29.

Hence, in the ninth embodiment, due to the formation of the new fifth and sixth magnetic circuits $D_5$ and $D_6$, the variation rate in the magnetic resistance in each small gap $d_1$ and $d_2$ can become larger, thereby the force to hole the driven member B at the rotated position denoted by $\theta$ against the external disturbance (external torque) (so-called, holding force) can further be increased.

The alternatives of the seventh, eighth, and ninth embodiments are generally the same as described in the second embodiment.

It is noted that the rotor shaft 30 or the shaft member 52, 54A, or 61 is connected to the valve, e.g., installed within an intake air passage of an internal combustion engine, the valve being exposed to an intake air flow as the external disturbance and being used to control an engine idling revolution speed. It is further noted that the strength of the magnetic flux flowing through the magnetic circuit in the magnetic circuit is proportional to the electromotive force and is inversely proportional to the magnetic resistance. It is finally noted that the valve used to control the engine idling revolustion speed is exemplified by U.S. Pat. No. 5,365,903 issued on Nov. 22, 1994 and U.S. Pat. No. 5,375,574 issued on Dec. 27, 1994 (, both disclosures of which are herein incorporated by reference).

What is claimed is:

1. An actuating apparatus comprising:
   a) a stationary member;
   b) a driven member;
   c) first magnetic circuit forming means for forming a first magnetic circuit with said stationary member and with a part of said driven member;
   d) second magnetic circuit forming means for forming a second magnetic circuit with said stationary member and with another part of said driven member so as to be branched from a magnetic flux flowing in said first magnetic circuit on said driven member, a strength of a magnetic flux flowing in said second magnetic circuit being the same as that flowing in said first magnetic circuit and a direction of the magnetic flux flowing in said second magnetic circuit being opposite to that flowing in said first magnetic circuit so that said driven member is held at a position at which both of the stengths of the magnetic fluxes flowing through said first and second magnetic circuits are mutually balanced; and
   e) new magnetic flux generating means for generating at least one new magnetic flux whose direction is such that the magnetic flux flowing in either of the first or second magnetic circuit is strengthened and the magnetic flux flowing in the other of said first or second magnetic circuit is weakened so that the driven member is displaced at another position at which both of the strengths of the magnetic fluxes in both of the first and second magnetic circuits become again balanced.

2. An actuating apparatus as claimed in claim 1, wherein said stationary member comprises a cylindrical yoke made of a ferromagnetic material and said driven member is disposed within said cylindrical yoke and comprises a rotor shaft made of a non-magnetic material and wherein said first magnetic circuit forming means comprises a first permanent magnet made of a ferrite magnet fixed onto an inner peripheral surface of said cylindrical yoke and having an inner magnetized peripheral surface and an outer magnetized peripheral surface; a first rotor yoke attached onto said rotor shaft and faced against the inner peripheral surface of the first permanent magnet via a predetermined gap ($c_1$); and a stator attached onto the inner peripheral surface of the cylindrical yoke and faced against an outer peripheral surface of said first rotor yoke via a predetermined gap ($b_1$).

3. An actuating apparatus as claimed in claim 2, wherein said second magnetic circuit forming means comprises a second permanent magnet made of the ferrite magnet fixed onto the inner peripheral surface of said cylindrical yoke at a symmetrical position to said first permanent magnet with an axial center of said rotor shaft as a center and having a different pole from that of the inner peripheral surface of the first permanent magnet; a second rotor yoke attached onto the outer peripheral surface of said rotor shaft with a predetermined gap ($a_1$) against an end surface of said first rotor yoke; the stator; and the cylindrical yoke.

4. An actuating apparatus as claimed in claim 3, wherein said new magnetic flux generating means comprises electromagnetic coil means wound around the stator for generating the new magnetic flux whose strength depends on a duty ratio of a duty ratio signal generated from a duty ratio signal generating means.

5. An actuating apparatus as claimed in claim 4, wherein said electromagnetic coil means comprises a pair of first and second coils, said first coil generating the new magnetic flux $\phi_1$ whose direction is the same as that of the magnetic flux flowing in the second magnetic circuit $D_2$ but is opposite to that of the magnetic flux flowing in the first magnetic circuit $D_1$ and said second coil generating the new magnetic flux $\phi_2$ whose direction is the same as that of the magnetic flux flowing in the first magnetic circuit $D_1$ but is opposite to the magnetic flux flowing in the second magnetic circuit $D_2$.

6. An actuating apparatus as claimed in claim 1, wherein said stationary member comprises a cylindrical body yoke made of a ferromagnetic material and said driven member is disposed within said cylindrical body yoke and comprises a cylindrical shaft member made of a non-magnetic material and being slidably supported on said cylindrical body yoke and wherein said first magnetic circuit forming means comprises: a first annular permanent magnet made of a ferrite magnet, fixed onto an inner peripheral surface of said body yoke at a first position of the body yoke, and having an inner magnetized peripheral surface and an outer magnetized peripheral surface; the cylindrical body yoke; a stator attached onto the inner peripheral surface of the body yoke at a second position of the body yoke; and an annular plunger made of the ferromagnetic material, attached onto said shaft member, and faced against the inner peripheral surface of said first permanent magnet via a predetermined gap ($c_1$).

7. An actuating apparatus as claimed in claim 6, wherein said second magnetic circuit forming means comprises: a second annular permanent magnet made of the ferrite magnet, fixed onto the inner peripheral surface of said body yoke at a third position of the body yoke, and having the inner magnetized peripheral surface of a different pole from that of the inner magnetized peripheral surface of the first permanent magnet and the outer magnetized peripheral surface; the cylindrical body yoke; the stator; and a second annular plunger made of the ferromagnetic material, attached onto the outer peripheral surface of said shaft member, and faced against an end surface of said first annular plunger via a predetermined gap (a), and faced against the second permanent magnet via a predetermined gap ($c_2$).

8. An actuating apparatus as claimed in claim 7, wherein said new magnetic flux generating means comprises electromagnetic coil means located at a position of the cylindrical body yoke between the stator and either of the first or second permanent magnet.

9. An actuating apparatus as claimed in claim 8, wherein said electromagnetic means comprises a pair of first and second coils, the first coil being wound around the position of the body yoke between the first position on which the first permanent magnet is attached and the second position on which the stator is attached and the second coil being wound around the position of the body yoke between the second position on which the stator is attached and the third position on which the second permanent magnet is attached.

10. An actuating apparatus as claimed in claim 1, wherein said first and second magnetic circuit forming means comprise: magnetic flux generating means for generating the magnetic flux to flow into both of the first and second magnetic circuits; and magnetic flux branching means for branching the magnetic flux generated by the magnetic flux generating means into two magnetic fluxes flowing through both of the first and second magnetic circuits so that the direction of the magnetic flux flowing through the first magnetic circuit is opposite to that flowing through the second magnetic circuit.

11. An actuating apparatus as claimed in claim 10, wherein said stationary member comprises upper and lower body yokes (1A, 2A) made of ferromagnetic materials and said driven member comprises a rotor shaft (30) made of a non-magnetic material, wherein said magnetic flux generating means comprises an arc-shaped permanent magnet attached onto an inner peripheral surface of said upper body yoke (1A) and said magnetic flux branching means comprises the upper body yoke (1A) and wherein said first magnetic circuit forming means comprises the permanent magnet (14), the upper cylindrical yoke (1A), a first linkage yoke (5) linked to both ends of the upper and lower body yokes, a first stator yoke (3A) linked to an end portion of the first linkage yoke, a first stator (15), a predetermined gap ($c_1$), a first rotor yoke faced against the first stator via the predetermined gap and fixed onto the outer peripheral surface of the rotor shaft, and a predetermined gap ($b_1$) between the permanent magnet (14) and the first rotor yoke.

12. An actuating apparatus as claimed in claim 11, wherein said second magnetic circuit forming means comprises: the predetermined magnet (14), the upper cylindrical body yoke (1A), a second linkage yoke (6) linked to the other end of the upper cylindrical body yoke (1A), a second stator yoke (4A), a second stator (16) located at a symmetrical position of the stationary member to the first stator (15) with an axial center of the rotor shaft as a center, a predetermined gap ($c_2$), a second rotor yoke (32) attached onto the outer peripheral surface of the rotor shaft (30), a predetermined gap ($b_2$) between the second rotor yoke and the permanent magnet.

13. An actuating apparatus as claimed in claim 12, wherein said new magnetic flux generating means comprises electromagnetic coil means wound around each of said first and second stators (15 and 16) for generating the new magnetic flux ($\phi_1$) whose direction is opposite to that of the magnetic flux flowing through the first magnetic circuit ($D_1$) and for generating another new magnetic flux ($\phi_2$) whose direction is opposite to that of the magnetic flux flowing through the second magnetic circuit ($D_2$).

14. An actuating apparatus as claimed in claim 13, which further comprises: third magnetic circuit forming means for forming a third magnetic circuit ($D_3$) in said stationary member and in said driven member, a direction of a magnetic flux flowing through said third magnetic circuit ($D_3$)

being the same as that of the magnetic flux flowing through said first magnetic circuit ($D_1$) so as to strengthen the magnetic flux flowing through the first magnetic circuit ($D_1$); and fourth magnetic circuit forming means for forming a fourth magnetic circuit ($D_4$) in said stationary member and in said driven member, a direction of a magnetic flux flowing through said fourth magnetic circuit being the same as that of the magnetic flux flowing through said second magnetic circuit ($D_2$) so as to strengthen the magnetic flux flowing through said second magnetic circuit ($D_2$).

15. An actuating apparatus as claimed in claim 14, wherein said third and fourth magnetic circuit forming means comprises a common stator (18B) attached onto an inner peripheral surface of said lower body yoke (2A) and faced against outer peripheral surfaces of said first and second rotor yokes (31 and 32) via predetermined gaps ($c_1$ and $c_2$).

16. An actuating apparatus as claimed in claim 14, which further comprises: fifth magnetic circuit forming means for forming a fifth magnetic circuit ($D_5$), a direction of a magnetic flux flowing through said fifth magnetic circuit ($D_5$) being opposite to that of the magnetic flux flowing through said first magnetic circuit ($D_1$) in said first stator (15) so as to weaken the magnetic flux flowing through the first magnetic circuit ($D_1$); and sixth magnetic circuit forming means for forming a sixth magnetic circuit ($D_6$), a direction of a magnetic flux flowing through said sixth magnetic circuit ($D_6$) being opposite to that of the magnetic flux flowing through said second magnetic circuit ($D_2$) in said second stator (16) so as to weaken the magnetic flux flowing through said second magnetic circuit ($D_2$).

17. An actuating apparatus as claimed in claim 16, wherein the direction of the magnetic flux flowing through the fifth magnetic circuit ($D_5$) is the same as that of the magnetic flux flowing through said third magnetic circuit ($D_3$) and the direction of the magnetic flux flowing through the sixth magnetic circuit ($D_6$) is the same as that of the magnetic flux flowing through said fourth magnetic circuit ($D_4$) and wherein said fifth and sixth magnetic circuit forming means comprise a second permanent magnet (29) attached onto an inner peripheral surface of the lower body yoke (2A) at a symmetrical position of the stationary member (A) to the first permanent magnet (14) with the axial center of the shaft member (30) as the center and faced against outer peripheral surfaces of said first and second rotor yokes (31 and 32) via predetermined gaps ($c_1$ and $c_2$).

18. An actuating apparatus as claimed in claim 1, wherein said driven member is linked to a valve installed in a part of an intake air passage of an internal combustion engine.

19. An actuating apparatus comprising:
a) a stationary member;
b) a driven member made of a non-magnetic material and arranged in said stationary member so as to be displaceable along said stationary member;
c) a pair of first and second fixed members made of magnetic materials spaced apart from each other with a first gap therebetween so as to be magnetically separated from each other with a first gap and extended along a displaceable direction of said driven member;
d) at least one stator made of the magnetic material and extended on said stationary member so that a first end surface thereof is faced against a second end surface of said first fixed member adjacent to said first gap with a second gap therebetween and a third end surface thereof is faced against a fourth end surface of said second fixed member adjacent to said first gap with a third gap;

e) at least one permanent magnet extended on the stationary member in a direction approximately orthogonal to said stator so as to face against a fifth end surface of said first fixed member so that a magnetic pole faced against said fifth end surface of said first fixed member is different from that magnetized on said fifth surface and so as to face against a sixth end surface of said second fixed member so that the magnetic pole faced against the sixth end surface of said second fixed member is different from that magnetized on said sixth end surface, said first end surface of said stator, said second end surface of said first fixed member, said fifth end surface of said first fixed member, said permanent magnet, and said stationary member forming a first magnetic circuit and said second end surface of said stator, said third end surface of said first fixed member, said permanent magnet, said stationary member forming a second magnetic circuit, directions of magnetic fluxes flowing in said first and second magnetic circuits being different from each other within said stator and magnetomotive forces of said first and second magnetic circuits being mutally the same so as to make said driven member not be displaced.

20. An actuating apparatus as claimed in claim 19, which further comprises: electromagnetic coil means for operatively generating a new magnetic flux whose direction is the same as either direction of the magnetic flux generated in the first or second magnetic circuit so that said driven member is displaced in a direction determined according to the magnetomotive force generated by said electromagnetic coil means.

21. An actuating apparatus as claimed in claim 20, wherein said driven member comprises a rotor shaft, said pair of first and second fixed members are extended on a periphery of said rotor shaft in an arc form, said rotor is constituted in a convex form of a cross section, said permanent magnet comprises a pair of the permanent magnets faced with each other via said fourth and fifth gaps, said pair of said first and second fixed members and said rotor shaft, and said electromagnetic coil means comprises electromagnetic coils wound around said stator in mutually opposite directions.

22. An apparatus as claimed in claim 21, wherein said electromagnetic coil means is so arranged and constructed as to enable a switching of the direction of the new magnetic flux generated in said stator in a normal direction or reverse direction and to enable a control of an magnetomotive force generated in either of the normal direction or the reverse direction of said new magnetic flux.

23. An apparatus as claimed in claim 22, wherein said electromagnetic coil means comprises a pair of coils each wound around said stator and each coil being connected to duty ratio signal generating means external to said actuating apparatus, said duty ratio signal generating means generating and outputting a duty ratio signal S(D) to each coil so that either one of the pair of the coils receives the duty ratio signal during an OFF duty time duration to generate the new magnetic flux in the same direction as the magnetic flux in either of the first or second magnetic circuit and the other of the coils receives the duty ratio signal during an ON duty time duration to generate the new magnetic flux in the same direction as the magnetic flux of the other of the first or second magnetic circuit.

24. An apparatus as claimed in claim 21, wherein said second and fifth end surfaces of said first fixed member and said fourth and sixth end surfaces are formed in respective arc shaped concentrically with the rotor shaft.

25. An apparatus as claimed in claim 21, wherein said second and fifth end surfaces of said first fixed member and said fourth and sixth end surfaces are formed mutually in respective linear shapes.

26. A method for actuating a driven member (B) to displace at a position, said driven member being disposed within a stationary member (A) and being linked to a valve installed in an intake air passage of an internal combustion engine and exposed to an intake air flow as external disturbance, said method comprising the steps of:

a) forming a first magnetic circuit ($D_1$) with said stationary member and with a part of said driven member;

b) forming a second magnetic circuit ($D_2$) with said stationary member and with another part of said driven member so as to be branched from a magnetic flowing in said first magnetic circuit on said driven member, a strength of a magnetic flux flowing through said second magnetic circuit being the same as that of a magnetic flux flowing through said first magnetic circuit and a direction of the magnetic flux flowing through said second magnetic circuit being opposite to that of the magnetic flux flowing through said first magnetic circuit so that said driven member is held at another position at which both of the strengths of the magnetic fluxes flowing through said first and second magnetic circuits are mutually balanced; and c) generating at least one new magnetic flux whose direction is such that the magnetic flux flowing through either of said first or second magnetic circuit is strengthened and the magnetic flux flowing through the other of the first or second magnetic circuit is weakened so that the driven member is displaced at the position at which the strengths of the magnetic fluxes in both of the first and second magnetic circuits become again balanced.

* * * * *